(12) United States Patent
Iyer et al.

(10) Patent No.: US 11,797,938 B2
(45) Date of Patent: Oct. 24, 2023

(54) PREDICTION OF PSYCHOMETRIC ATTRIBUTES RELEVANT FOR JOB POSITIONS

(71) Applicant: OPENSESAME, INC., Portland, OR (US)

(72) Inventors: Ganesh Iyer, San Jose, CA (US); Roman Samarev, San Jose, CA (US)

(73) Assignee: OPENSESAME INC, Portland, OR (US)

( * ) Notice: Subject to any disclaimer, the term of this patent is extended or adjusted under 35 U.S.C. 154(b) by 470 days.

(21) Appl. No.: 16/394,672

(22) Filed: Apr. 25, 2019

(65) Prior Publication Data

US 2020/0342410 A1 Oct. 29, 2020

(51) Int. Cl.
*G06Q 10/1053* (2023.01)
*G06N 5/02* (2023.01)

(52) U.S. Cl.
CPC ........... *G06Q 10/1053* (2013.01); *G06N 5/02* (2013.01)

(58) Field of Classification Search
CPC .............................. G06Q 10/1053; G06N 5/02
See application file for complete search history.

(56) References Cited

U.S. PATENT DOCUMENTS

| | | | |
|---|---|---|---|
| 7,502,748 B1 * | 3/2009 | Baldwin | G06Q 10/06 705/7.14 |
| 7,885,902 B1 | 2/2011 | Shoemaker et al. | |
| 8,200,527 B1 | 6/2012 | Thompson et al. | |
| 8,204,809 B1 | 6/2012 | Wise | |
| 8,214,238 B1 | 7/2012 | Fairfield et al. | |
| 8,311,863 B1 | 11/2012 | Kemp | |
| 8,417,715 B1 | 4/2013 | Bruckhaus et al. | |
| 8,644,596 B1 | 2/2014 | Wu et al. | |
| 9,396,483 B2 | 7/2016 | Hamedi | |
| 10,020,076 B1 | 7/2018 | Anumalasetty et al. | |
| 10,147,105 B1 | 12/2018 | Iyer et al. | |
| 10,990,847 B2 | 4/2021 | Samarev et al. | |
| 11,068,917 B2 | 7/2021 | Samarev et al. | |
| 11,238,391 B2 | 2/2022 | Iyer et al. | |
| 2002/0042786 A1 | 4/2002 | Scarborough et al. | |
| 2002/0045154 A1 | 4/2002 | Wood et al. | |
| 2003/0130884 A1 | 7/2003 | Michaluk | |
| 2004/0210661 A1 | 10/2004 | Thompson | |
| 2006/0265269 A1 * | 11/2006 | Hyder | G06Q 10/10 705/321 |

(Continued)

OTHER PUBLICATIONS

Prewitt, Edward. "Personality tests in hiring: how to do it right." Harvard Manag Update 3 (1998): 8-10. (Year: 1998).*

(Continued)

*Primary Examiner* — Brendan S O'Shea
(74) *Attorney, Agent, or Firm* — Buchalter; Cecily Anne O'Regan

(57) ABSTRACT

Predicting psychometric attributes and relevant skills for a first job position includes generation of predictor models based on test data of tests users. The test data includes resumes of the test users, job descriptions of job positions of the test users, historical data of the test users, and answers provided by the test users to psychometric questions. The predictor models are then used to predict the psychometric attributes and the relevant skills based on target data, which is a first job description of the first job position.

19 Claims, 11 Drawing Sheets

(56) References Cited

U.S. PATENT DOCUMENTS

| | | |
|---|---|---|
| 2007/0050215 A1 | 3/2007 | Kil et al. |
| 2007/0094060 A1 | 4/2007 | Apps et al. |
| 2007/0245379 A1 | 10/2007 | Agnihortri |
| 2008/0015871 A1 | 1/2008 | Eder |
| 2008/0065468 A1 | 3/2008 | Berg et al. |
| 2008/0260218 A1 | 10/2008 | Smith et al. |
| 2009/0018891 A1 | 1/2009 | Eder |
| 2009/0094090 A1 | 4/2009 | Dow |
| 2009/0254971 A1 | 10/2009 | Herz et al. |
| 2009/0276231 A1 | 11/2009 | Bazigos et al. |
| 2009/0327068 A1 | 12/2009 | Pradeep et al. |
| 2011/0020778 A1 | 1/2011 | Forbes et al. |
| 2013/0339099 A1 | 12/2013 | Aidroos |
| 2014/0058794 A1 | 2/2014 | Malov et al. |
| 2014/0082645 A1 | 3/2014 | Stern et al. |
| 2014/0214709 A1 | 7/2014 | Greaney |
| 2015/0006422 A1* | 1/2015 | Carter ............... G06Q 10/1053 705/321 |
| 2015/0161567 A1* | 6/2015 | Mondal ............... G06Q 10/1053 705/321 |
| 2015/0310393 A1 | 10/2015 | Bhaskaran et al. |
| 2015/0342511 A1 | 12/2015 | Goldberg |
| 2016/0019411 A1 | 1/2016 | Bart et al. |
| 2016/0078471 A1 | 3/2016 | Hamedi et al. |
| 2016/0080485 A1 | 3/2016 | Hamedi |
| 2016/0086089 A1 | 3/2016 | Ritchie et al. |
| 2017/0124074 A1 | 5/2017 | Cama et al. |
| 2017/0188976 A1 | 7/2017 | Kalra et al. |
| 2017/0193533 A1 | 7/2017 | Lai et al. |
| 2017/0213190 A1* | 7/2017 | Hazan ............... G06Q 10/1053 |
| 2017/0287473 A1 | 10/2017 | Levanon et al. |
| 2017/0364744 A1 | 12/2017 | Savchenkov et al. |
| 2018/0018630 A1 | 1/2018 | Oni |
| 2019/0034976 A1 | 1/2019 | Hamedi et al. |
| 2020/0184343 A1 | 6/2020 | Samarev et al. |
| 2020/0184425 A1 | 6/2020 | Mondal et al. |
| 2020/0184529 A1 | 6/2020 | Samarev et al. |
| 2020/0327503 A1* | 10/2020 | Mendes ............... G06F 16/3334 |
| 2020/0342410 A1 | 10/2020 | Iyer et al. |
| 2021/0073737 A1 | 3/2021 | Flynn et al. |

OTHER PUBLICATIONS

Roberts, Brent, et al. "Personality measurement and assessment in large panel surveys." Forum for health economics & policy. vol. 14. No. 3. De Gruyter, 2011. (Year: 2011).*

Sawleshwarkar, Shreya, et al. "Simplified recruitment model using text-mining on psychometric and aptitude tests." 2018 Second International Conference on Electronics, Communication and Aerospace Technology (ICECA). IEEE, 2018. (Year: 2018).*

Cap, A study of the usefulness and effectiveness of a self-instructional print module on multicultural behaviour change in apprentices in manitoba (Order No. 9525912). Available from ProQuest Dissertations and Theses Professional (Year: 1995).

Day, The relationship of the business with the in-house IT department: A customer-provider perspective (Order No. 10694424). Available from ProQuest Dissertations and Theses Professional (2003).

Hu et al., A Study on User Perception of Personality-Based Recommender Systems, Conference: User Modeling, Adaptation, and Personalization, 18th International Conference, UMAP 2010, Big Island, HI, USA, Jun. 20-24, 2010 (Year: 2010).

Pedersen, A quantitative examination of critical success factors comparing agile and waterfall project management methodologies (Order No. 3602588). Available from ProQuest Dissertations and Theses Professional (Year: 2013).

Stroop Effect, Wikipedia, Oct. 2018 https://web.archive.org/web/20181026055326/https://en.wikipedia.org/wiki/Stroop_effect (Year: 2018).

* cited by examiner

RESUME — 402

- Name: John Doe — 404

Positions held: — 406

Lead web developer
    Company: ABC Inc.
    Experience: 2 years
    Responsibilities:

Senior web developer
    Company: ABC Inc.
    Experience: 2 years
    Responsibilities:

Associate web developer
    Company: XYZ technologies ltd.
    Experience: 2 years
    Responsibilities:

Qualification: Bachelor of Science (Computer Science) from PQR University — 408

Skills: C, C++, HTML, CSS, Ruby on rails, JavaScript — 410

Awards: ABCDE award for……
    EFGHI award for……… — 412

Hobbies: Skiing, dancing, and gaming — 414

FIG. 4

PREDICTION OF PSYCHOMETRIC ATTRIBUTES RELEVANT FOR JOB POSITIONS

FIELD

Various embodiments of the disclosure relate generally to machine learning. More specifically, various embodiments of the disclosure relate to prediction of psychometric attributes relevant for job positions.

BACKGROUND

Any organization, at any given point of time, may have openings for various job positions. The organization may invite job applicants to apply for the job positions by posting job descriptions of the job positions on online job application portals. Recruitment of the job applicants may be handled by the organization and/or a recruitment agency associated with the organization.

A recruitment process for recruiting a job applicant for a job position typically includes multiple rounds of screening, tests, and interviews. During screening (i.e., a screening round), resumes or curriculum vitae (CVs) of various job applicants are shortlisted by the recruitment agency and/or the organization. In certain scenarios, the recruitment agency may not be completely aware of various skills and/or psychometric attributes that are required in a job applicant, who is applying for the job position. This may result in unsuitable job applicants clearing the screening round (i.e., false positives) and/or suitable job applicants failing the screening round (i.e., false negatives). Consequently, a sub-optimal pool of job applicants may be shortlisted for the next round. Additionally, current recruitment processes typically involve significant overheads (for example, in regards to man-hours) associated with manually shortlisting the resumes and/or CVs of the job applicants.

In light of the foregoing, there is a need for a solution that overcomes the aforementioned problems and selects the most suitable job applicants for a given job position.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

Prediction of psychometric attributes relevant for a job position is provided substantially as shown in, and described in connection with, at least one of the figures, as set forth more completely in the claims.

These and other features and advantages of the disclosure may be appreciated from a review of the following detailed description of the disclosure, along with the accompanying figures in which like reference numerals refer to like parts throughout.

BRIEF DESCRIPTION OF THE DRAWINGS

FIG. 4 is a block diagram that illustrates a first resume of a test user of FIG. 1, in accordance with an exemplary embodiment of the disclosure;

DETAILED DESCRIPTION

Figure 1:
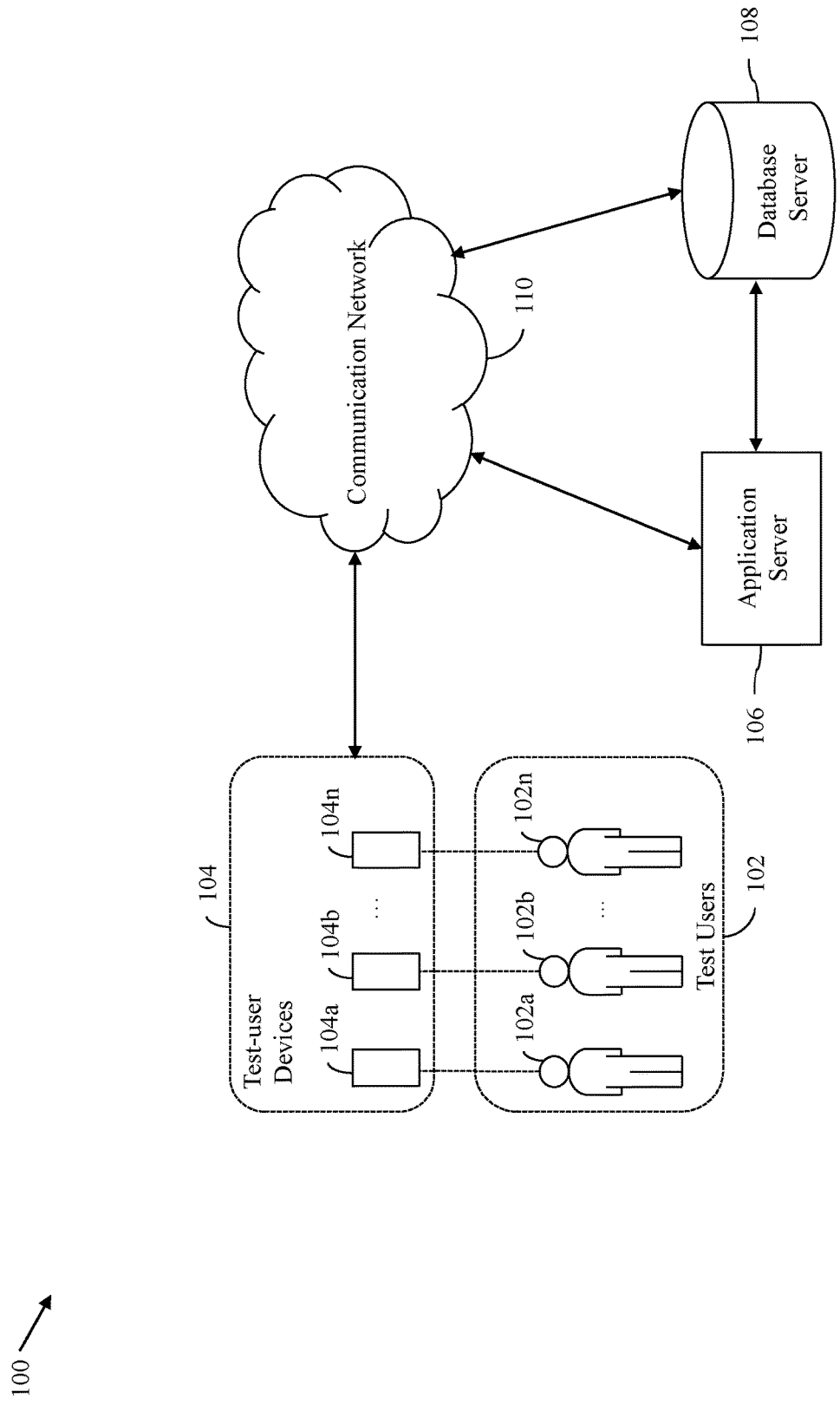
FIG. 1 is a block diagram that illustrates an exemplary environment for prediction of psychometric attributes relevant for a job position, in accordance with an exemplary embodiment of the disclosure.

Certain embodiments of the disclosure may be found in a disclosed apparatus for predicting psychometric attributes relevant for a first job position. Exemplary aspects of the disclosure provide methods and systems for predicting psychometric attributes required for the first job position. The method includes receiving, by a server, a plurality of answers provided by each test user of a plurality of test users and a plurality of job descriptions of a plurality of job positions. Each test user is associated with at least one job position of the plurality of job positions. For each test user, a set of psychometric scores corresponding to a set of psychometric attributes is derived by the server. The set of psychometric scores for each test user may be derived based on the corresponding plurality of answers. One or more predictor models may be generated by the server based on the plurality of job descriptions and the set of psychometric scores of each test user. For the first job position, a set of threshold scores corresponding to the set of psychometric attributes is predicted by the server. The set of threshold scores is determined based on the one or more predictor models and a first job description of the first job position.

Another embodiment provides the system for predicting psychometric attributes relevant for a first job position. The system includes a server that may be configured to receive a plurality of answers provided by each test user of a plurality of test users and a plurality of job descriptions of a plurality of job positions. Each test user is associated with at least one job position of the plurality of job positions. The server may be configured to derive, for each test user, a set of psychometric scores corresponding to a set of psychometric attributes. The set of psychometric scores for each test user may be derived based on the corresponding plurality of answers. The server may be configured to generate one or more predictor models based on the plurality of job descriptions and the set of psychometric scores of each test user. The server may be configured to predict, for the first job position, a set of threshold scores corresponding to the set of psychometric attributes. The set of threshold scores is determined based on the one or more predictor models and a first job description of the first job position.

Another embodiment provides a computer program product comprising a non-transitory computer readable medium that stores computer program code for predicting psychometric attributes relevant for a first job position. The computer program code is executable by one or more processors in a computing device to receive a plurality of answers provided by each test user of a plurality of test users and a plurality of job descriptions of a plurality of job positions. Each test user is associated with at least one job position of the plurality of job positions. The one or more processors may be configured to derive, for each test user, a set of psychometric scores corresponding to a set of psychometric attributes. The set of psychometric scores for each test user is derived based on the corresponding plurality of answers. The one or more processors may be configured to generate one or more predictor models based on the plurality of job descriptions and the set of psychometric scores of each test user. The one or more processors may be configured to predict, for the first job position, a set of threshold scores corresponding to the set of psychometric attributes. The set of threshold scores is determined based on the one or more predictor models and a first job description of the first job position.

The disclosure involves the prediction of psychometric attributes relevant for a first job position by analyzing job descriptions of job positions associated with test users and answers provided by the test users to psychometric questions. The answers provided by the test users to the psychometric questions allow recruiters to gain insights into the subconscious minds of the test users. As the subconscious mind is responsible for a majority of decision-making tasks and is directly related to an individual's psychometric orientation, the disclosure enables recruiters to recruit the most suitable job applicants to the job positions. In one exemplary scenario, the predicted psychometric attributes may be used by organizations or recruitment agencies for recruiting the most suitable job applicants for job positions at the organizations. In another exemplary scenario, the predicted psychometric attributes may be used by an organization to judge job-affinities of employees to job positions of the employees.

FIG. 1 is a block diagram that illustrates an exemplary environment 100 for prediction of psychometric attributes relevant for a job position, in accordance with an exemplary embodiment of the disclosure. The environment 100 includes test users 102a-102n (hereinafter, designated and referred to as 'the test users 102'), test-user devices 104a-104n (hereinafter, designated and referred to as 'the test-user devices 104'), an application server 106, and a database server 108. The test-user devices 104, the application server 106, and the database server 108 may communicate with each other by way of a communication network 110 or any other communication means established therebetween.

The test users 102 are individuals, whose test data may be used by the application server 106 for generating predictor models that predict psychometric attributes and/or skills relevant (i.e., relevant skills) for one or more job positions. The test data of each test user 102 may include job descriptions of various job positions associated with the corresponding test user 102, historical data of the corresponding test user 102, a resume of the corresponding test user 102, and/or answers provided by the corresponding test user 102 to various psychometric questions. For example, the job positions associated with the test user 102a may include a job position currently held by the test user 102a, job positions held in the past by the test user 102a, and job positions for which the test user 102a was considered a relevant candidate. The historical data of the test user 102a may refer to data collected based on past events pertaining to the test user 102a (i.e., data generated either manually or automatically by the test user 102a). The historical data of the test user 102a may include, but is not limited to, curriculum information, travel history, purchase history of the test user 102a, an activity log of the test user 102a on the Internet and various social media platforms, or the like. The answers to the psychometric questions may be provided by the test user 102a when the psychometric questions are presented to the test user 102a through various online tests (such as, but not limited to, the multiple intelligence quiz, the BIG 5, or the personal globe inventory) on the test-user device 104a.

The test-user devices 104 may include suitable logic, circuitry, interfaces, and/or code, executable by the circuitry, that may be configured to perform one or more operations for providing the test data of the test users 102 to the application server 106. In one exemplary scenario, the test-user devices 104 may refer to communication devices of the test users 102. The test-user devices 104 may be configured to allow the test users 102 to communicate with the application server 106 and the database server 108. The test-user devices 104 may be configured to serve as an interface for providing the test data of the test users 102 to the application server 106. In one embodiment, the test-user device 104a may be configured to run or execute a software application (e.g., a mobile application or a web application), which may be hosted by the application server 106, for presenting various psychometric questions to the test user 102a for answering. The test-user device 104a may be further configured to communicate, to the application server 106, the answers provided by the test user 102a to the psychometric questions. The test-user device 104a may be further configured to run or execute the software application for accessing a first resume of the test user 102a from a memory of the test-user device 104a. Based on the consent of the test user 102a, the test-user device 104a may be configured to communicate the first resume of the test user 102a to the application server 106. The test-user device 104a may be further configured to keep track of an online activity of the test user 102a. For example, the test-user device 104a may be configured to store, in the memory of the test-user device 104a, an activity log of the test user 102a which includes details of social media activity of the test user 102a, a travel history of the test user 102a, a browsing history of the test user 102a, or the like.

The social media activity of the test user 102a may include, but is not limited to, posts (such as statuses, photos, or the like) posted or uploaded by the test user 102a on social media platforms and material (such as pages, statuses, or the like) liked or followed by the test user 102a on the social media platforms. The social media activity of the test user 102a may further include websites browsed by the test user 102a and various interests that the test user 102a expresses by liking, following, and/or sharing one or more posts on the Internet and the social media platforms. For example, the activity log may include information pertaining to the products liked by the test user 102a on the social media platforms. In another example, the test-user device 104a may be configured to communicate to the application server 106, in real time, information pertaining to locations (i.e., location information) visited by the test user 102a. The test-user device 104a may be further configured to access, with the consent of the test user 102a, a social media profile of the test user 102a for retrieving the historical data of the test user 102a. Examples of the test-user devices 104 may include, but are not limited to, mobile phones, smartphones, laptops, tablets, phablets, or other devices capable of communicating via the communication network 110.

The application server 106 may include suitable logic, circuitry, interfaces, and/or code, executable by the circuitry, that may be configured to perform one or more operations for predicting psychometric attributes, psychometric scores, and/or skills relevant for one or more job positions. The application server 106 may be a physical or cloud data processing system on which a server program runs. The application server 106 may be implemented in hardware or software, or a combination thereof. The application server 106 may be configured to host the software application which may be accessible on the Internet for providing a psychometric attribute and relevant skills prediction service. The application server 106 may be configured to utilize the software application for retrieving the test data of the test users 102. The application server 106 may be further configured to use a tracker or a web crawler to track the activities of the test users 102 on the Internet and the social media platforms for retrieving the test data. The application server 106 may further use the web crawler for retrieving job descriptions of the job positions associated with the test users 102.

The application server 106 may be configured to implement a learning phase based on the test data for generating the predictor models. The predictor models may be statistical predictive models generated by means of machine learning algorithms. Examples of the algorithms used for generating the predictor models may include, but are not limited to, a Support Vector Machine (SVM), a Logistic Regression model, a Bayesian Classifier model, a Decision Tree Classifier, a Copula-based Classifier, a K-Nearest Neighbors (KNN) Classifier, a Random Forest (RF) Classifier, or Artificial neural networks.

After the generation of the predictor models, the application server 106 may be configured to implement a prediction phase in which the predictor models are used to predict psychometric attributes, psychometric scores, and/or skills relevant for a first job position based on target data. The target data may be a first job description of the first job position for which the relevant psychometric attributes, the psychometric scores, and/or the skills are to be predicted. In one embodiment, the target data may be used as input to the predictor models for predicting various business outcomes as well. In one exemplary scenario, a recruitment agency may be interested in determining psychometric attributes, psychometric scores, and/or skills relevant for the first job position. In another exemplary scenario, an organization associated with the first job position may want to know the skills and the psychometric attributes relevant for the first job position, prior to recruiting a job applicant for the first job position. In another exemplary scenario, the target data and the predictor models may be used, by the organization, to assess a job-affinity of an employee of the organization. The target data (i.e., the first job description) may be in a textual format, a portable document format (PDF), or any other format that may be used to define job descriptions of job positions. In one exemplary scenario, the application server 106 may be configured to obtain the target data in a manner that is similar to obtaining the test data of the test users 102. In another exemplary scenario, a recruitment agency may manually provide, by accessing the software application, the target data to the application server 106 to determine the relevant skills and the psychometric attributes for the first job position.

The application server 106 may be realized through various web-based technologies, such as, but not limited to, a Java web-framework, a .NET framework, a PHP framework, or any other web-application framework. Examples of the application server 106 may include, but are not limited to, computers, laptops, mini-computers, mainframe computers, mobile phones, tablets, and any non-transient and tangible machines that may execute a machine-readable code, a cloud-based server, or a network of computer systems. Various functional elements of the application server 106 have been described in detail in conjunction with FIG. 2. Generation of the predictor models is described later in FIG. 5.

The database server 108 may include suitable logic, circuitry, interfaces, and/or code, executable by the circuitry, that may be configured to perform one or more operations for managing and storing various forms of data. The database server 108 may be configured to store data, such as the test data retrieved from the test users 102, the target data, and the predictor models generated by the application server 106. The database server 108 may be configured to receive a query from the application server 106 to extract the data stored in the database server 108. Based on the received query, the database server 108 may be configured to provide the requested data to the application server 106 over the communication network 110. Examples of the database server 108 may include, but are not limited to, MySQL® and Oracle®.

The communication network 110 may include suitable logic, circuitry, interfaces, and/or code, executable by the circuitry that may be configured to transmit content and messages between various entities, such as the test-user devices 104, the application server 106, and the database server 108. Examples of the communication network 110 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the application server 106 may be configured to perform the prediction of the psychometric attributes and/or the relevant skills in two phases, such as the learning and prediction phases. The learning phase may focus on generation of the predictor models. During the learning phase, the application server 106 may be configured to retrieve the test data from the test users 102. The test data may include the resumes of the test users 102, the job descriptions of the job positions associated with the test users 102, the historical data of the test users 102, and the answers provided by the test users 102 to the psychometric questions. During the learning phase, the application server 106 may be further configured to analyze the test data for generating the predictor models. For example, the resumes of the test users 102 may be analyzed to extract text data for information such as job positions held (currently or in the past) by the test users 102, hobbies of the test users 102, educational qualifications of the test users 102, skills possessed by the test users 102, or the like. The job descriptions of the job positions associated with the test users 102 may be analyzed to extract text data for information such as, but not limited to, job titles of the job positions, skills relevant for the job positions, responsibilities associated with the job positions, educational qualifications relevant for the job positions, or work experience required of job applicants applying for the job positions. The answers provided by the test users 102 may be analyzed to derive psychometric scores of the test users 102 for various psychometric attributes.

The psychometric attributes may refer to behavioral qualities or characteristics of an individual's persona. Personality attributes (such as BIG5 attributes and RIASEC Holland occupational themes) are one example of psychometric attributes. As per BIG5 attributes, the personality attributes may be classified into five areas of: neuroticism, openness, conscientiousness, extraversion, and agreeableness. As per RIASEC Holland occupational themes, the personality attributes may be classified into six categories: Realistic (Doers), Investigative (Thinkers), Artistic (Creators), Social (Helpers), Enterprising (Persuaders), and Conventional (Organizers). Other examples of psychometric attributes may include, but are not limited to, Gardener's Multiple Intelligences theory related attributes, emotional attributes, aesthetic preferences, and the like. Likewise, the historical data of each test user 102 may be filtered and normalized to remove irrelevant information. The application server 106 may be further configured to utilize the analyzed test data as input for the machine learning algorithms to generate the predictor models. The analyzed test data and the predictor models may be stored in the database server 108.

The learning phase may be followed by the prediction phase. During the prediction phase, the application server 106 may be configured to retrieve the target data. The target data may include the first job description of the first job position. The first job description may be indicative of a first job title, a first set of responsibilities, a first set of skills, or the like, associated with the first job position. The target data may be obtained by the application server 106 from a target website (such as a job application portal) or the database server 108. The application server 106 may be further configured to analyze the target data for predicting, for the first job position, threshold scores for the psychometric attributes. The threshold scores may be predicted by using the first job description of the first job position as input to the predictor models. The application server 106 may be further configured to predict skills relevant for the first job position. The skills relevant for the first job position may be predicted by using the first job description of the first job position as input to the predictor models. In another embodiment, the application server 106 may be further configured to identify, based on the first job description and the predictor models, one or more job applicants relevant for the first job position. The learning phase is explained in detail in conjunction with FIG. 5 and the prediction phase is explained in detail in conjunction with FIG. 6.

Figure 2:
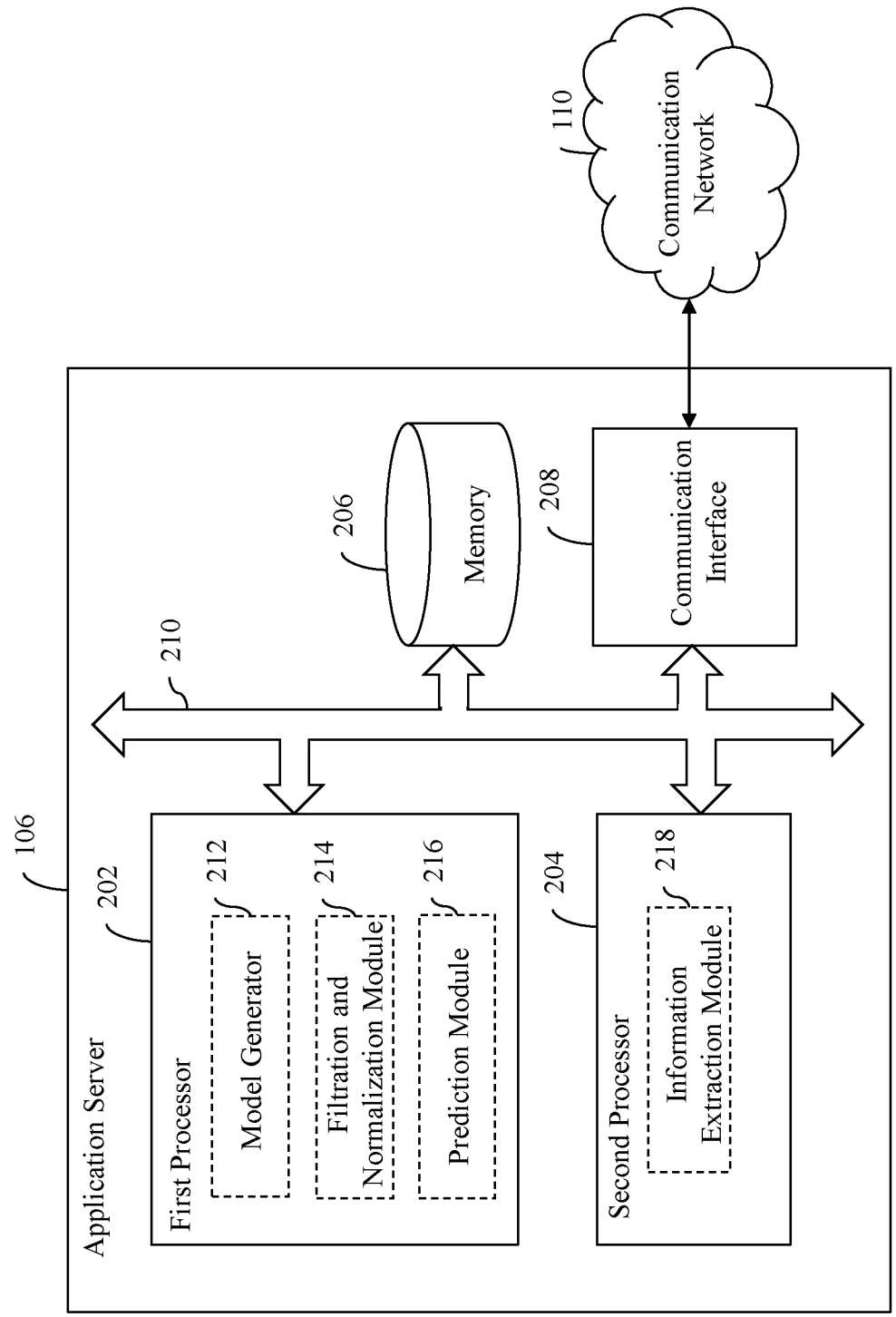
FIG. 2 is a block diagram that illustrates an application server of FIG. 1, in accordance with an exemplary embodiment of the disclosure.

FIG. 2 is a block diagram that illustrates the application server 106, in accordance with an exemplary embodiment of the disclosure. The application server 106 may include first and second processors 202 and 204, a memory 206, and a communication interface 208. The first and second processors 202 and 204, the memory 206, and the communication interface 208 may communicate with each other by means of a communication bus 210.

The first processor 202 may include suitable logic, circuitry, interfaces, and/or code, executable by the circuitry, that may be configured to perform one or more operations for implementing the learning and prediction phases. The first processor 202 may be configured to obtain the test data of the test users 102 and the target data. The first processor 202 may be configured to analyze the test data for generating the predictor models. The first processor 202 may be further configured to predict the psychometric attributes and skills relevant for the first job position based on the target data (i.e., the first job description of the first job position) and the predictor models. Examples of the psychometric attributes may include, but are not limited to, skills and knowledge, abilities, attitudes, emotional attributes, aesthetic preferences, and personality attributes. The first processor 202 may include multiple functional blocks, such as: a model generator 212, a filtration and normalization module 214, and a prediction module 216. Examples of the first processor 202 may include, but are not limited to, an application-specific integrated circuit (ASIC) processor, a reduced instruction set computing (RISC) processor, a complex instruction set computing (CISC) processor, a field-programmable gate array (FPGA), and the like.

The second processor 204 may include suitable logic, circuitry, interfaces, and/or code, executable by the circuitry, that may be configured to execute one or more operations for analysis of the test data and the target data (i.e., the first job description). The second processor 204 may include an information extraction module 218. The information extraction module 218 may include suitable logic, circuitry, interfaces, and/or code, executable by the circuitry, that may be configured to extract text data from the job descriptions of the job positions and the resumes associated with the test users 102. The text data extracted from the text of resumes of the test users 102 may include, but is not limited to, skills of the test users 102, hobbies of the test users 102, educational qualifications of the test users 102, job positions associated with the test users 102, or achievements of the test users 102. The text data extracted from the text of job descriptions of the job positions associated with the test users 102 may include, but is not limited to, job titles of the job positions, skills relevant for the job positions, work experience required for the job positions, responsibilities associated with the job positions, or compensation packages (e.g., salary and perks) associated with the job positions. The information extraction module 218 may be further configured to extract text data from the first job description (i.e., the target data). The text data extracted from the text of the first job description (i.e., the target data) may include, but is not limited to, a job title of the first job position, work experience required for the first job position, a set of responsibilities associated with the first job position, skills relevant to the first job position, or the like. Examples of the second processor 204 may include, but are not limited to, a digital signal processor (DSP), an ASIC processor, a RISC processor, a CISC processor, an FPGA, and the like.

The memory 206 may include suitable logic, circuitry, interfaces, and/or code, executable by the circuitry, that may be configured to store instructions that enable the first and second processors 202 and 204 to execute their operations. In one embodiment, the memory 206 may be configured to store the test data, the target data, and the predictor models. Examples of the memory 206 may include, but are not limited to, a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 206 in the application server 106, as described herein. In another embodiment, the memory 206 may be realized in form of a cloud storage working in conjunction with the application server 106, without departing from the scope of the disclosure.

The communication interface 208 may include suitable logic, circuitry, interfaces, and/or code, executable by the circuitry, that may be configured to transmit and receive data to (or form) various entities, such as the test-user devices 104 and/or the database server 108 over the communication network 110. Examples of the communication interface 208 may include, but are not limited to, an antenna, a radio frequency transceiver, a wireless transceiver, a Bluetooth transceiver, an Ethernet port, a universal serial bus (USB) port, or any other device configured to transmit and receive data. The communication interface 208 may be configured to communicate with the test-user devices 104 and the database server 108 using various wired and wireless communication protocols, such as TCP/IP, UDP, LTE communication protocols, or any combination thereof.

The model generator 212 and the filtration and normalization module 214 may include suitable logic, circuitry, interfaces, and/or code, executable by the circuitry, that may be configured to implement the learning phase for generating the predictor models. During the learning phase, the test data may be received and analyzed. For examples, the model generator 212 may be configured to analyze the answers provided by the test users 102 for deriving the psychometric scores of the test users 102 for the psychometric attributes. The filtration and normalization module 214 may be configured to analyze the historical data of the test users 102. The information extraction module 218 may be configured to analyze the resumes of the test users 102 and the job descriptions of the job positions associated with the test users 102 to extract the text data from the resumes and the job descriptions. The model generator 212 may be configured to use the analyzed historical data, the derived psychometric scores, and the extracted text data for generating the predictor models. For the generation of the predictor models, the model generator 212 may be configured to use various machine learning algorithms such as, but not limited to, regression based predictive learning and neural networks based predictive leaning. In one embodiment, the model generator 212 may be further configured to update the predictor models to improve the prediction accuracy of the predictor models based on a feedback provided by a user (for example, an organization or a recruitment agency) that uses the psychometric attribute and relevant skills prediction service offered by the application server 106.

The filtration and normalization module 214 may be configured to normalize and filter the historical data of the test users 102. Since the historical data of the test users 102 is obtained from multiple data sources which may have different data formats, the filtration and normalization module 214 may be configured to normalize the historical data by converting the historical data to a default data format with one or more data controllable fields. For example, when the historical data of the test users 102 is received from the data sources, the historical data may be in a plurality of data formats (such as Comma-separated Values (CSV) format, Tab-separated Values (TSV) format, Extensible Markup Language (XML) format). The filtration and normalization module 214 may be configured to convert the plurality of data formats into the default data format, for example, a textual format having controllable fields. The data controllable fields may include a name field, a content field, a source field, a type of data field, or the like. After normalizing the historical data of the test users 102, the filtration and normalization module 214 may be configured to filter the normalized historical data. For example, the filtration and normalization module 214 may be configured to filter the commonly used words (such as "the", "is", "at", "which", "on", and the like) as irrelevant information from the normalized historical data and normalize the remaining historical data to make it more meaningful. In another example, the normalized historical data may be filtered for parsing specific keywords such as, but not limited to, identifying a stream of numbers that may represent a mobile number, extracting keywords related to personality, likes, dislikes, or the like. In another example, the normalized historical data may be filtered for extracting one or more named entities which are related to specific objects or actions (for example, identifying full name of an institution by recognizing informal name of the institution in a post) and recognizing one or more activities which are mentioned indirectly (for example, recognizing a type of sport activity by referring a place description or a club name in a post). In another example, the historical data may be analyzed to generate a set of related entities based on skills in the historical data, for example, Java developer as a skill may correspond to a "programmer". Likewise, Spring Boot and Java Server Pages as skills may further correspond to "web development" and "Java developer" as skills.

The prediction module 216 may include suitable logic, circuitry, interfaces, and/or code, executable by the circuitry, that may be configured to implement the prediction phase for predicting the psychometric attributes (i.e., threshold scores for the psychometric attributes) and the skills relevant for the first job position by using the target data as input to the predictor models. The threshold scores may define a cut-off limit for the psychometric scores of the psychometric attributes that are relevant for the first job position.

Figure 3:
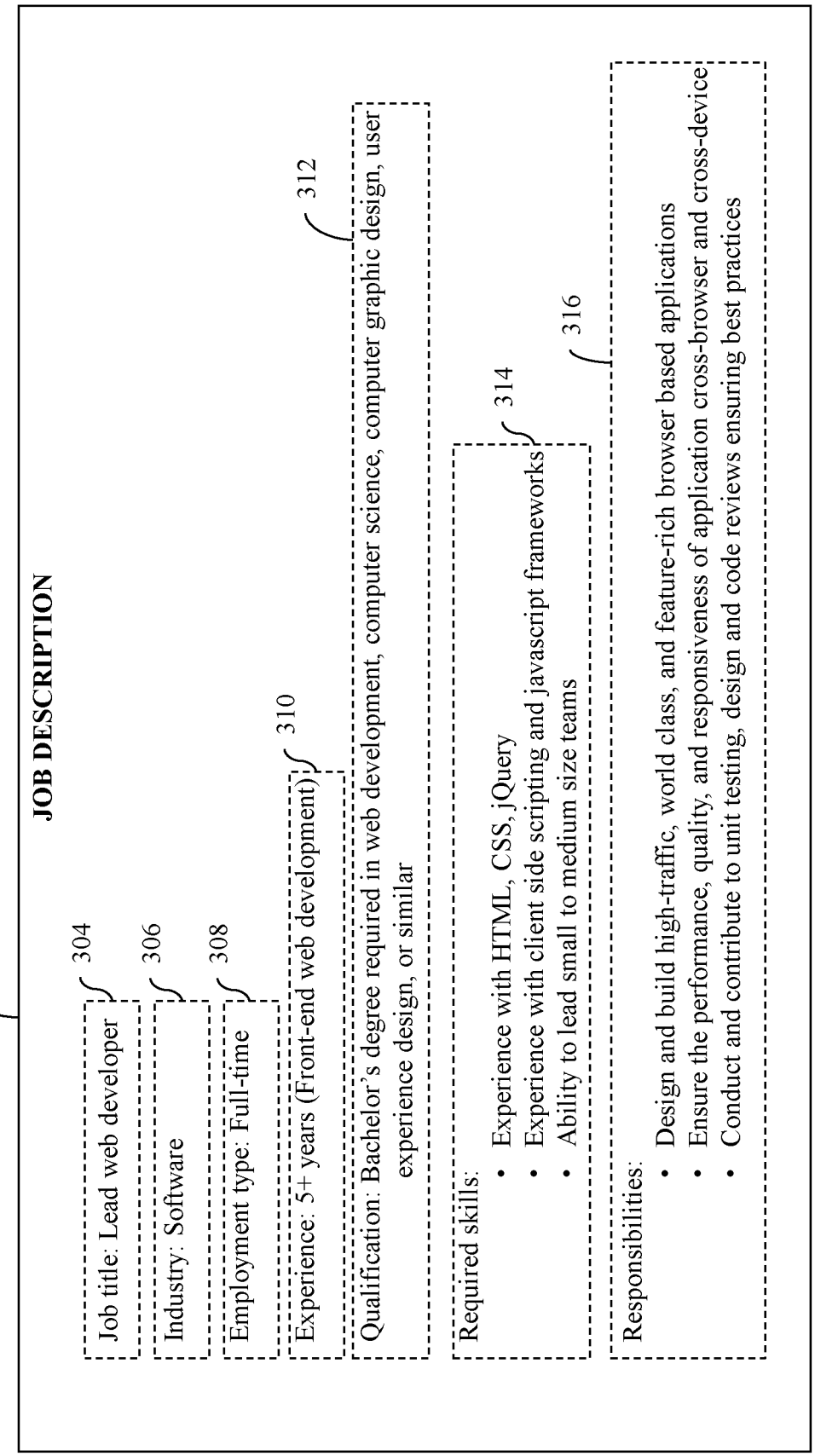
FIG. 3 is a block diagram that illustrates a first job description of a first job position, in accordance with an exemplary embodiment of the disclosure.

FIG. 3 is a block diagram that illustrates the first job description of the first job position, in accordance with an exemplary embodiment of the disclosure. Hereinafter, the first job description is designated and referred to as 'the first job description 302'. The first job description 302 includes various sections, such as sections 304-316, such that each section is indicative of one of a first job title, a first industry type, a first employment type, a first work experience, a first set of relevant academic qualifications, a first set of skills, a first set of responsibilities relevant for the first job position. In other words, the first job description 302 describes a set of required skills, a set of relevant academic qualifications, and a work experience required of job applicants applying for the first job position.

The section 304 indicates the first job title (e.g., 'lead web developer') of the first job position. The section 306 indicates the first industry type (i.e., 'software industry') of the first job position. The section 308 indicates the first employment type (e.g., 'full time') of the first job position. The section 310 indicates the first work experience required of job applicants for the first job position. For example, the section 310 indicates that, for the first job position, the job applicants are required to have at least five years of work experience in front-end web development. The section 312 indicates the first set of relevant academic qualifications (e.g., a bachelor's degree in computer science) required of the job applicants for the first job position. The section 314 indicates the first set of skills (e.g., an ability to lead small to medium size teams) required of the job applicants for the first job position. The section 316 of the first job description 302 indicates the first set of responsibilities (e.g., design and build high-traffic, world class, and feature-rich browser-based applications) relevant for the first job position.

It will be apparent to those of skill in the art that the first job description 302 is merely exemplary and that the first job description 302 may include sections in addition to those described above. For example, the first job description 302 may also indicate a first compensation package (e.g., a first salary) associated with the first job position. Further, the job descriptions of the job positions associated with the test users 102 are similar to the first job description 302 without deviating from the scope of the disclosure.

FIG. 4 is a block diagram that illustrates the first resume of the test user 102a, in accordance with an exemplary embodiment of the disclosure. Hereinafter, the first resume is designated and referred to as 'the first resume 402'. The first resume 402 includes various sections, such as sections 404-414, such that each section is indicative of one of a name of the test user 102a, a first set of job positions associated with the test user 102a, educational qualifications of the test user 102a, skills of the test user 102a, awards won by the test user 102a, hobbies of the test user 102a.

The section 404 indicates the name (i.e., 'John Doe') of the test user 102a. The section 406 indicates the first set of job positions (e.g., 'lead web developer', 'senior web developer', and 'associate web developer') associated with the test user 102a. The section 406 further indicates organizations (e.g., 'ABC Inc.' and 'XYZ technologies ltd.') associated with the first set of job positions, and work experience (e.g., '2 years') and responsibilities associated with first set of job positions. The section 408 indicates the educational qualification (e.g., 'bachelor of Science in Computer Science from PQR University') of the test user 102a. The section 410 indicates the skills of the test user 102a. For example, the section 410 indicates a proficiency of the test user 102a in 'C', 'C++', 'Ruby on rails', and 'JavaScript'. The section 412 indicates the awards (e.g., 'ABCDE award' and 'EFGHI' award) won by the test user 102a and the section 414 indicates the hobbies (e.g., skiing, dancing, and gaming) of the test user 102a.

It will be apparent to those of skill in the art that the first resume 402 is merely exemplary and does not limit the scope of the disclosure in any manner. In other embodiments, the first resume 402 may include sections other than the sections 404-414. Further, the resumes of the other test users 102b-102n may be similar to the first resume 402.

Figure 5:
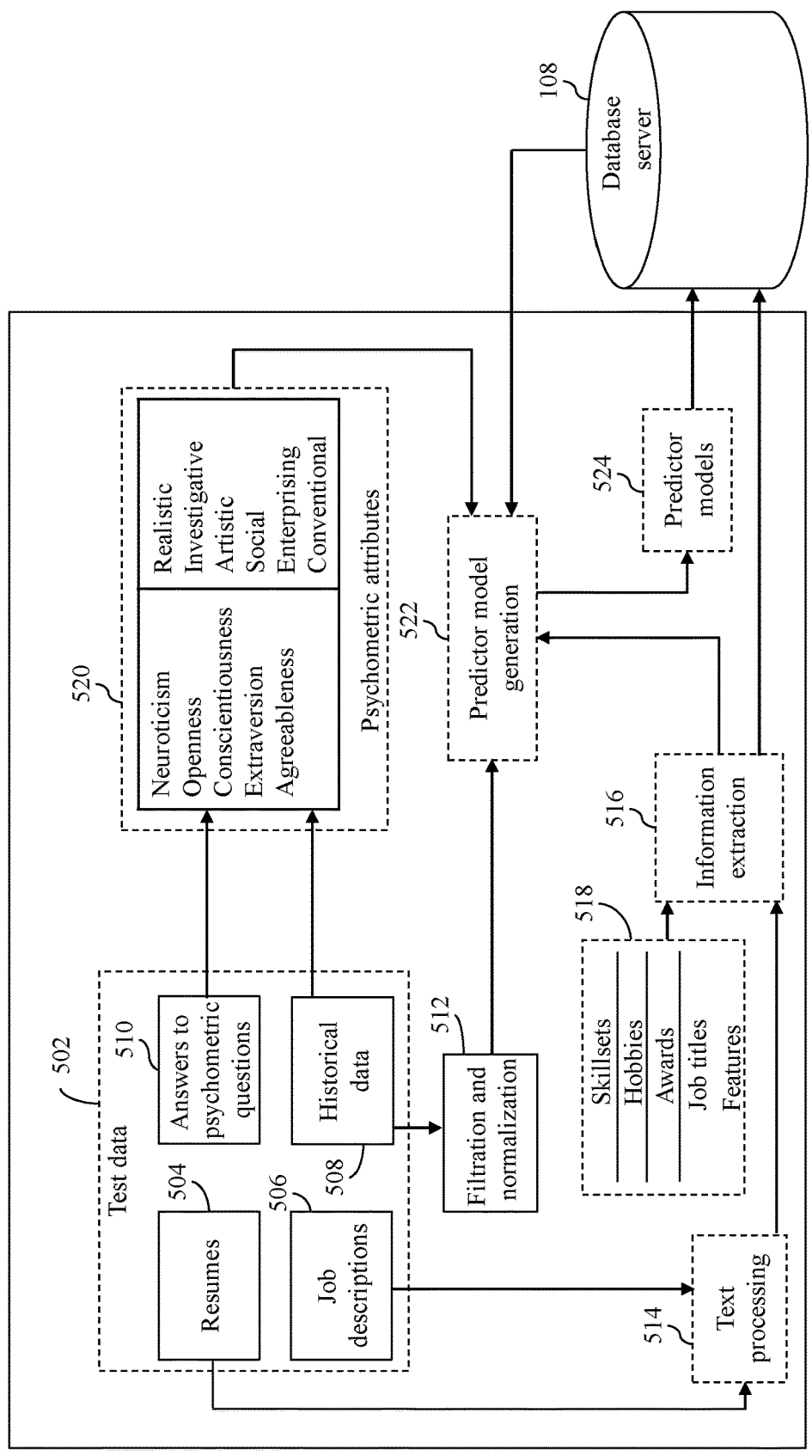
FIG. 5 is a block diagram that illustrates an exemplary scenario for generating predictor models, in accordance with an exemplary embodiment of the disclosure.

FIG. 5 is a block diagram that illustrates an exemplary scenario 500 for generating the predictor models, in accordance with an exemplary embodiment of the disclosure. The exemplary scenario 500 involves the application server 106, and the database server 108. The application server 106 may be configured to retrieve the test data (hereinafter, designated and referred to as 'the test data 502') of the test users 102 as a part of the learning phase (i.e., training phase). The test data 502 may include the resumes (hereinafter, designated and referred to as 'the resumes 504') of the test users 102, the job descriptions (hereinafter, designated and referred to as 'the job descriptions 506') of the job positions associated with the test users 102, the historical data (hereinafter, designated and referred to as 'the historical data 508') of the test users 102, and the answers (hereinafter, designated and referred to as 'the answers 510') provided by the test users 102 to the psychometric questions. For the sake of brevity, the retrieval of the test data 502 is explained with respect to the test user 102a. However, it will be apparent to those of skill in the art that the application server 106 may be configured to retrieve the test data 502 of the other test users 102b-102n in a similar manner as described for the test user 102a.

The resumes 504 may include the first resume 402 of the test user 102a and the job descriptions 506 may include job descriptions of various job positions (e.g., 'lead web developer', 'senior web developer', 'associate web developer') associated with the test user 102a. In one embodiment, the application server 106 may be configured to retrieve the first resume 402 from the test-user device 104a of the test user 102a or from an online platform or database, based on the consent of the test user 102a. In one embodiment, the application server 106 may be configured to utilize the software application that runs on the test-user device 104a to retrieve, with the consent of the test user 102a, the first resume 402 stored in the memory of the test-user device 104a. The application server 106 may be configured to determine an association between the test user 102a and various job positions (i.e., the job positions held by the test user 102a) based on the first resume 402. For example, the application server 106 may be configured to extract text data indicating the job positions from the first resume 402 to determine the job positions held by the test user 102a. The application server 106 may be further configured to retrieve the job descriptions for the job positions held by the test user 102a from the test-user device 104a, an online job portal, a social networking website, or an online database (for example, O*NET database), based on a consent of the test user 102a.

The historical data 508 of the test user 102a may include, but is not limited to, the curriculum information, the travel history, and the purchase history of the test user 102a. The historical data 508 of the test user 102a may further include one or more posts that are shared, followed, or liked by the test user 102a on the Internet and the social media platforms. For example, the test-user device 104a, executing the software application hosted by the application server 106, may be configured to access the activity log of the test user 102a for obtaining the travel history and the purchase history of the test user 102a. The test-user device 104a may be further configured to communicate the obtained travel history and the purchase history to the application server 106. Based on a consent of the test user 102a, the test-user device 104a may be configured to access the social media profile (for example LinkedIn®, Facebook®, or the like) of the test user 102a for retrieving one or more posts that are shared, followed, or liked by the test user 102a on the social media profile. The test-user device 104a may be further configured to communicate the retrieved posts to the application server 106. In one embodiment, the application server 106 may be configured to communicate a questionnaire to the test-user device 104a regarding the historical data of the test user 102a. The test-user device 104a may be configured to communicate, to the application server 106, a response provided by the test user 102a to the questionnaire. The application server 106 may be configured to include the travel history, the purchase history, the posts, and the response, of the test user 102a in the historical data 508.

The application server 106 may be further configured to prompt the test user 102a by way of the test-user device 104a to take one or more online tests (such as, but not limited to, the multiple intelligence quiz, the BIG 5, or the personal globe inventory) that include the psychometric questions. The answers 510 to the psychometric questions are then provided by the test user 102a and communicated to the application server 106 by the test-user device 104a. In one exemplary scenario, the psychometric questions may include one hundred questions, each of which is associated with a linear scale. For example, the linear scale may be scored from 0 to 9, where score '0' means there is no correlation between the test user 102a and a question statement, and score '9' means the test user 102a and the question statement completely correlate. In this scenario, the answer to each psychometric question may be a score selected by the test user 102a from the linear scale. In another exemplary scenario, the psychometric questions may include hundred questions each associated with a set of options, such as four options, having a specific score associated therewith. The test user 102a may be required to select one or more options from the set of options for each psychometric question as the answer. It will be apparent to a person of skill in the art that the abovementioned examples are for illustrative purpose and should not be construed to limit the scope of the disclosure. In another embodiment, the application server 106 may be configured to retrieve the answers 510 from third-party servers (not shown) that conduct psychometric analyses of various users via online tests.

After retrieving the test data 502 of the test users 102, the application server 106 may be configured to process the test data 502. Processing of the test data 502 may involve filtering and normalizing (as represented by block 512) the historical data 508. The historical data 508 retrieved from the test users 102 may include irrelevant information. Thus, the filtration and normalization module 214 may be configured to normalize and filter the historical data 508 so that only relevant information is processed further. For example, the filtration and normalization module 214 may be configured to normalize the historical data 508 by converting the historical data 508 to the default data format with the data controllable fields and to filter the commonly used words (such as "the", "is", "at", "which", "on", and the like) as irrelevant information from the normalized historical data 508. In another example, the filtration and normalization module 214 may be configured to parse specific keywords, such as, but not limited to, identifying a stream of numbers that may represent a mobile number, extracting keywords related to personality, job, likes, dislikes, or the like, in the normalized historical data 508. In another example, the filtration and normalization module 214 may be configured to extract one or more named entities which are related to specific objects or actions (for example, identifying full name of an institution by recognizing informal name of the institution in a post) from the normalized historical data 508 and recognize one or more activities which are mentioned indirectly (for example, recognizing a type of sport activity by referring a place description or a club name in a post) in the normalized historical data 508.

Processing of the test data 502 may further involve analyzing the resumes 504 and the job descriptions 506. For analyzing the resumes 504, the information extraction module 218 may be configured to process and extract first text data from the resumes 504. Text processing is represented by block 514 and information extraction is represented by block 516 in FIG. 5. The information extraction module 218 may be configured to extract the first text data from the resumes 504 by parsing various keywords in the resumes 504. The first text data extracted from the text of the resumes 504 may include phrases and/or terms from the resumes 504 that are indicative of features, such as the job positions (e.g., 'lead web developer') held by the test users 102, skills of the test users 102, hobbies of the test users 102, awards won by the test users 102, or the like (as represented by block 518). For example, the first text data extracted from the text of the first resume 402 may include phrases and/or terms that are indicative of the first set of job positions associated with the test user 102a, the educational qualifications of the test user 102a, the skills of the test user 102a, the awards won by the test user 102a, or the hobbies of the test user 102a. In other words, the first text data extracted from the first resume 402 includes recognition of entities and categories related to the set of features indicated by block 518. Further, based on the first text data extracted from the first resume 402, the information extraction module 218 may be configured to generate a set of related entities, such as related skills. For example, if the first text data extracted from the first resume 402 includes a phrase "experience in Spring Framework with Java Server Faces", the first text data is considered to be related to entities "Java Programmer" and "Web development" as skills. Further, if the first text data extracted from the first resume 402 includes a Java programming, Spring Boot, and Java Server Pages as skills, the information extraction module 218 may relate the phrase "experience in Spring Framework with Java Server Faces" to "Java Programmer" and "Web development" with high probability. The information extraction module 218 may be further configured to extract additional information, such as skills, of the test user 102a from various job titles listed in the first resume 402 and details (such as company activities) of the organizations with which the test user 102a has worked.

For analyzing the job descriptions 506, the information extraction module 218 may be configured to process and extract second text data from the job descriptions 506. Text processing is represented by the block 514 and information extraction is represented by the block 516. The second text data is extracted from the text of the job descriptions 506 by parsing one or more keywords in the job descriptions 506. The second text data extracted from the text of the job descriptions 506 may include phrases and/or terms from the job descriptions 506 that are indicative of features, such as job titles of the job positions associated with the job descriptions 506, skills relevant for the job positions, work experience required for the job positions, responsibilities associated with the job positions, or the like (as represented by the block 518). For example, the second text data extracted from the text of the first job description 302 may include phrases and/or terms that are indicative of the first job title, the first industry type, the first work experience required, the first employment type, the first set of skills, the first set of relevant academic qualifications, the first set of responsibilities, or the like. The information extraction module 218 may be further configured to refer one or more official dictionaries of occupational titles, for example O*Net database, to derive additional information for the first job description 302. The information extraction module 218 may be configured to store the first and second text data in the database server 108.

Processing of the test data 502 may further involve analyzing the answers 510 to derive psychometric scores of the test users 102 for the psychometric attributes (hereinafter, designated and referred to as 'the psychometric attributes 520'). For the sake of ongoing description, the psychometric attributes 520 are assumed to include neuroticism, openness, conscientiousness, extraversion, agreeableness, realistic, investigative, artistic, social, enterprising, and conventional. The first processor 202 may be configured to analyze the answers 510 of each test user 102 for deriving, for each test user 102, psychometric scores for the psychometric attributes 520. In one exemplary scenario, each of the psychometric attributes 520 may be associated with a cumulative sum range. When the answers 510 provided by the test user 102a include a score selected by the test user 102a from the linear scale for each psychometric question, the first processor 202 may be configured to determine a cumulative sum of the scores selected by the test user 102a. In another example, when the answers 510 provided by the test user 102a include one or more options selected by the test user 102a from the set of options associated with each psychometric question, the first processor 202 may be configured to determine the cumulative sum based on the scores associated with the options selected by the test user 102a.

The first processor 202 may be further configured to compare the cumulative sum with the cumulative sum range of each psychometric attribute 520 for deriving the psychometric scores of the test user 102a for the psychometric attributes 520. For example, the cumulative sum range of neuroticism may be [51, 70] and the cumulative sum of the test user 102a may be 44. In such a scenario, as the cumulative sum of the test user 102a is less than the lower bound of the cumulative sum range of neuroticism, the psychometric score of the test user 102a for neuroticism is '0'. In another example, the cumulative sum of the test user 102a may be 75. In such a scenario, as the cumulative sum of the test user 102a is greater than the upper bound of the cumulative sum range of neuroticism, the psychometric score for neuroticism is '1'. Likewise, the first processor 202 may derive the psychometric scores for the other psychometric attributes 520. It will be apparent to a person of skill in the art that the abovementioned exemplary scenario is for illustrative purpose and should not be construed to limit the scope of the disclosure. The first processor 202 may derive the psychometric scores for the psychometric attributes 520 based on the answers 510 by using any technique known in the art.

After the test data 502 is processed, the model generator 212 may be configured to use the analyzed historical data, the first and second text data, and the derived psychometric scores as input for predictor model generation (as represented by block 522). The model generator 212 may be configured to use one or more machine learning algorithms, such as regression based predictive learning, neural networks based predictive leaning, and the like, for generating the predictor models (hereinafter, designated and referred to as 'the predictor models 524'). During the generation of the predictor models 524, the model generator 212 may be configured to map the first and second text data extracted from the text of the resumes 504 and the job descriptions 506, respectively, to the psychometric attributes 520 and generate links therebetween. The model generator 212 may be further configured to map the historical data 508 with the psychometric attributes 520. In other words, a linear combination of features (as represented by block 518) indicated by the first and second text data and the historical data 508 is mapped to the psychometric scores of the test users 102. The model generator 212 may be further configured to assign weights to the generated links. The assigned weights indicate the strength of association between the psychometric attribute 520 and the features indicated by the first and second text data and the historical data 508. For example, for the test user 102a having the job title 'lead web developer' and the psychometric score of '0.3' for 'neuroticism', the model generator 212 may generate a first link between the job title 'lead web developer' and the psychometric score of '0.3' for 'neuroticism'. Further, the model generator 212 may assign a weight of '0.5' to the first link. In one scenario, when another test user, (for example, the test user 102b) has the job title 'lead web developer' and the psychometric score of '0.3' for 'neuroticism', the model generator 212 may be configured to increase the weight assigned to the first link. However, if the test user 102b has the job title 'lead web developer' and the psychometric score of '0.8' for 'neuroticism', the model generator 212 may be configured to adjust the weight of the first link and may generate another link having different weight between the job title 'lead web developer' and the psychometric score of '0.8' for 'neuroticism'. The model generator 212 may be configured to generate the predictor models 524 by using the weighted links. It will be apparent to a person of ordinary skill in the art that the abovementioned examples are for illustrative purpose, the model generator 212 may use other complex models for mapping and assigning weights without deviating from the scope of the disclosure.

The predictor models 524 generated by the model generator 212 may include two predictor models (i.e., first and second predictor models). The first predictor model may be capable of predicting, for a job position, threshold scores for each psychometric attribute 520 by using a corresponding job description as input. The second predictor model may be capable of predicting relevant skills for the job position by using the corresponding job description as input. In one embodiment, the predictor models 524 may include a third predictor model that is capable of predicting business outcomes (e.g., job affinity of employees for the first job position) for an organization by using a job description as input. The model generator 212 may be further configured to store the predictor models 524 in the database server 108. The predictor models 524 may be used by the prediction module 216 for predicting the threshold scores and relevant skills as described in conjunction with FIG. 6.

It will be apparent to a person of ordinary skill in the art that the features (as represented by the block 518) and the psychometric attributes 520 are shown for illustrative purpose and should not be construed as limiting the scope of the disclosure.

Figure 6:
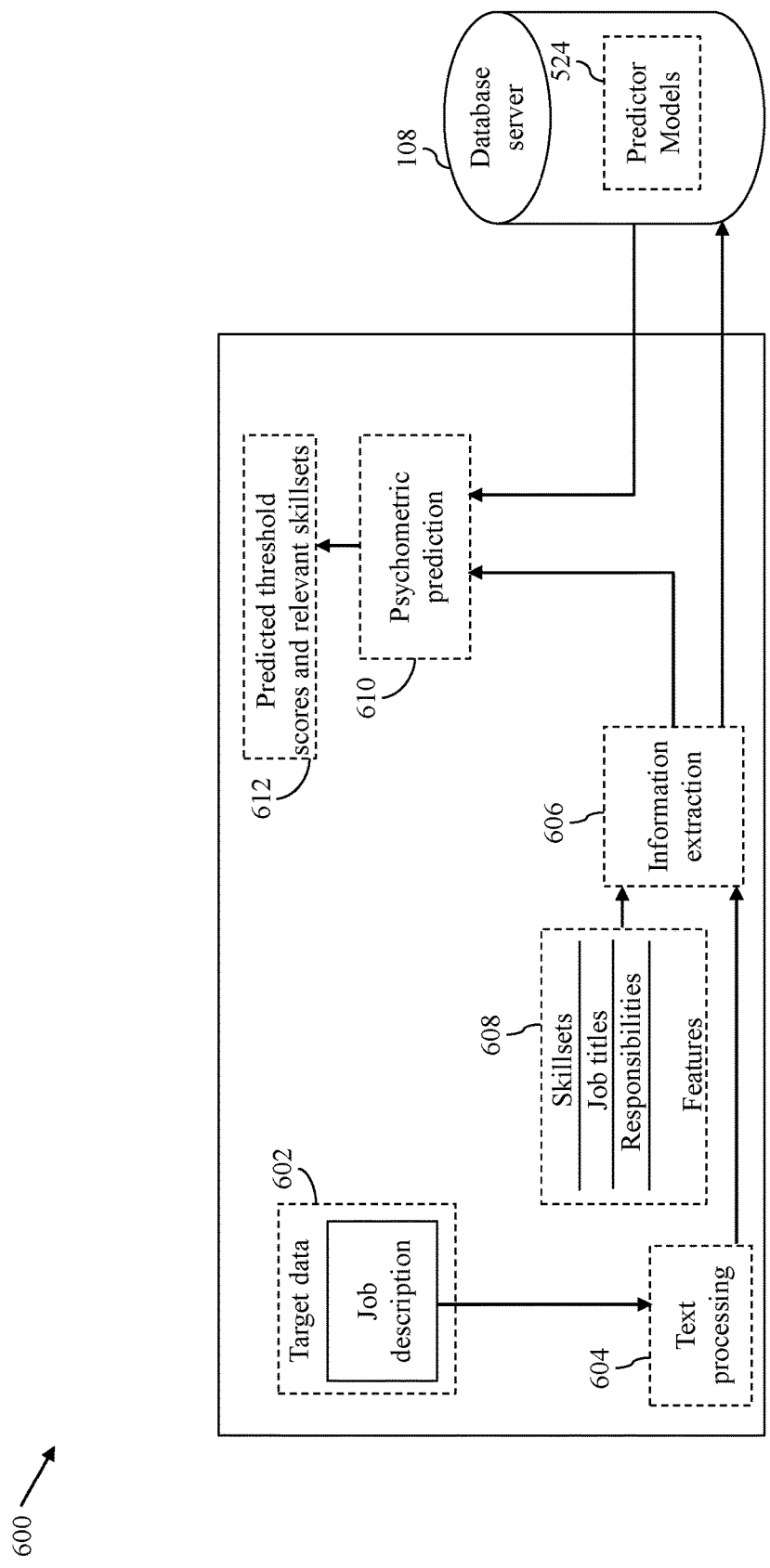
FIG. 6 is a block diagram that illustrates an exemplary scenario for predicting psychometric attributes relevant for the first job position, in accordance with an exemplary embodiment of the disclosure.

FIG. 6 is a block diagram that illustrates an exemplary scenario 600 for predicting the psychometric attributes relevant for the first job position, in accordance with an exemplary embodiment of the disclosure. The exemplary scenario 600 involves the target data (hereinafter, designated and referred to as 'the target data 602'), the application server 106, and the database server 108 that may store the predictor models 524. In a non-limiting example, it is assumed that the target data 602 is the first job description 302. It will be apparent to those of skill in the art that the target data 602 may include any other job description (for example, one of the job descriptions 506) without deviating from the scope of the disclosure.

In one embodiment, the application server 106 may be configured to retrieve the target data 602 by accessing an online job portal or an external database. In another embodiment, the target data 602 may be manually provided to the application server 106 by a first user (not shown) responsible for recruitment of job applicants to the first job position. After retrieving the target data 602, the application server 106 may be configured to process the target data 602 (i.e., the first job description 302). Processing of the target data 602 may involve analyzing the first job description 302. For analyzing the first job description 302, the information extraction module 218 may be configured to process and extract third text data from the first job description 302. Text processing is represented by block 604 and information extraction is represented by block 606 in FIG. 6. The third text data may include phrases and/or terms extracted from the text of the first job description 302 that are indicative of features, such as the first job title, the first industry type, the first employment type, the first amount of work experience, the first set of relevant academic qualifications, the first set of responsibilities, or the first set of skills (as represented by block 608). The third text data may accurately describe the first job position.

The prediction module 216 may be configured to query the database server 108 to retrieve the predictor models 524. The prediction module 216 may be configured to use the third text data as input to the first and second predictor models, respectively, for psychometric prediction (as represented by block 610). The psychometric prediction may yield a first set of threshold scores as output. The first set of threshold scores may be outputted by the first predictor model. For example, based on the third text data and the first predictor model, the prediction module 216 may identify those test users 102 who are associated with the first job position. In an exemplary scenario where the prediction module 216 determines that a majority of the test users 102, associated with the first job position, scored less than '0.5' for neuroticism, the prediction module 216 may predict that a first maximum score for neuroticism is '0.5' for job applicants applying for the first job position. Similarly, if the prediction module 216 determines that the majority of the test users 102, associated with the first job position, scored greater than '0.3' for extraversion, the prediction module 216 may predict that a first minimum score for extraversion is '0.3' for job applicants applying for the first job position. Similarly, if the prediction module 216 determines that the majority of the test users 102, associated with the first job position, scored between '0.6' and '0.8' for conscientiousness, the prediction module 216 may predict that a first score range for conscientiousness is '0.6-0.8' for job applicants applying for the first job position. The first maximum score, the first minimum score, and the first score range may be included in the first set of threshold scores, for neuroticism, extraversion, and conscientiousness, respectively. It will be apparent to those of skill in the art that the abovementioned scenario is for exemplary purpose and that more sophisticated/complicated methods for determining the first set of threshold scores may be used without deviating from the scope of the disclosure.

In one embodiment, the prediction module 216 may further be configured to predict the relevant skills for the first job position by using the third text data as input to the second predictor model. For example, based on the third text data and the second prediction model, the prediction module 216 may be configured to identify those test users 102 who are associated with the first job position. Thus, if the prediction module 216 determines that the resumes 504 of a majority of the test users 102, who are associated with the first job position, indicate proficiency in 'Ruby on rails' as a skill, the prediction module 216 may predict that proficiency in 'Ruby on rails' is a relevant skill for job applicants applying for the first job position. Similarly, if the prediction module 216 determines that the resumes 504 of a majority of the test users 102, who are associated with the first job position, indicate 'ability to lead a medium size team' as a skill, the prediction module 216 may predict that 'ability to lead a medium size team' is a relevant skill for job applicants applying for the first job position. In other words, the prediction module 216 may predict that 'ability to lead a medium size team' and proficiency in 'Ruby on rails' constitute the relevant skills for the first job position.

The application server 106 may be configured to communicate the first set of threshold scores and the relevant skills (as represented by block 612) to a first user device (not shown) of the first user. The prediction module 216 may be further configured to identify relevant job applicants for the first job position by using the predictor models 524 when the application server 106 is provided resumes of the job applicants. For example, the prediction module 216 may shortlist, from a pool of resumes, resumes that exhibit the first set of threshold scores and the relevant skills. In another embodiment, the prediction module 216 may be further configured to provide job recommendations to the job applicants by using the resumes of the job applicants and various job descriptions as input to the predictor models 524. Thus, based on the predicted threshold scores (i.e., the first set of threshold scores) and the relevant skills, intelligent and informed decisions may be made by the first user, in regards to recruitment of job applicants for the first job position. Thus, the first user may be aided in identifying relevant job applicants, reducing a time taken to screen resumes of multiple job applicants.

It will be understood by a person of ordinary skill in the art that the abovementioned predicted threshold scores and relevant skills are listed for exemplary purpose and should not be construed to limit the scope of the disclosure. In other embodiments, the predictor models 524 may be utilized to predict threshold scores and relevant skills that are different threshold scores and relevant skills mentioned above.

In one embodiment, the application server 106 may be configured to render a user interface (UI) on the first user device for presenting the predicted threshold scores and relevant skills to the first user. In one example, the application server 106 may render the UI through the software application hosted by the application server 106. The first user device may be configured to run the software application. A feedback (for example, a feedback score) may be provided by the first user to the application server 106, by way of the software application, for indicating an accuracy of the predicted threshold scores and relevant skills.

Figure 7A:
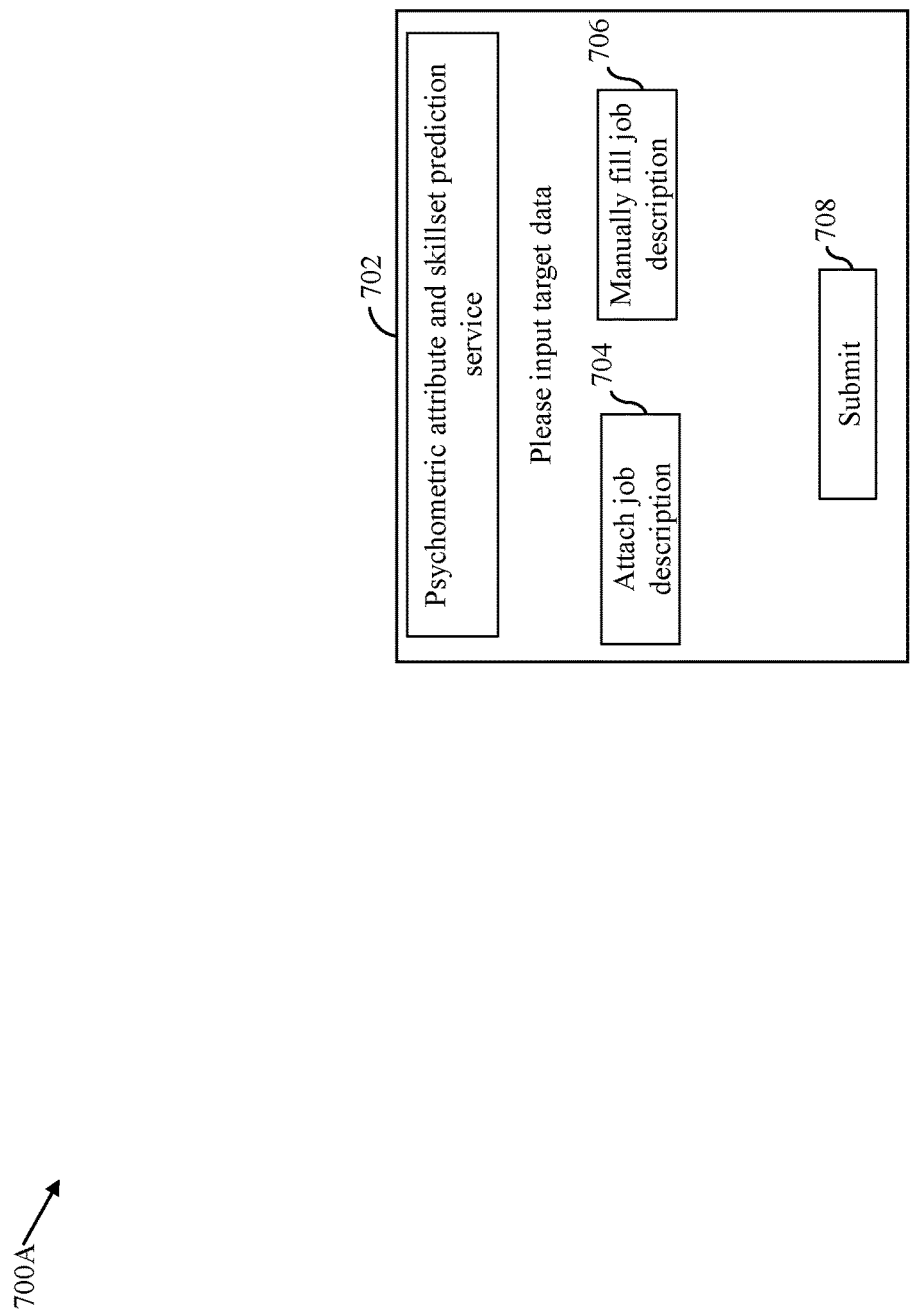
FIGS. 7A and 7B are block diagrams that illustrate user interface (UI) screens rendered on a first user device of a first user by the application server 106 for receiving target data and presenting predicted threshold scores and relevant skills, respectively, in accordance with an exemplary embodiment of the disclosure.

FIG. 7A is a block diagram 700A that illustrates a UI screen 702 rendered on the first user device by the application server 106 for receiving the target data 602, in accordance with an exemplary embodiment of the disclosure. The UI screen 702 may include a first message requesting the first user to input (i.e., enter) the target data 602 (i.e., the first job description 302). The UI screen 702 further includes first and second user-selectable options 704 and 706, respectively. The first user-selectable option 704 allows the first user to upload a file of the first job description 302 as an attachment. In one embodiment, the target data 602 may need to be in a format (e.g., textual format or PDF format) acceptable to the application server 106. The second user-selectable option 706 allows the first user to manually enter the first job description 302 on a digital form (not shown) on another UI screen (not shown) that may be rendered on the first user device. The digital form may include various sections that may allow that first user to enter the first job title, the first employment, the first employment type, the first set of skills, the first set of relevant academic qualifications, or the like. The UI screen 702 may further include a first submit button 708. When the first user selects the first submit button 708, the first user device may communicate the first job description 302 (i.e., the target data 602) to the application server 106.

It will be apparent to a person of ordinary skill in the art that the UI screen 702 is shown for illustrative purposes and should not be construed to limit the scope of the disclosure. In another embodiment, the application server 106 may also allow the first user to provide resumes of job applicants that have applied for the first job position. The application server 106 may identify job applicants relevant to the first job position based on the resumes of the job applicants, the first job description 302, and the predictor models 524.

Figure 7B:
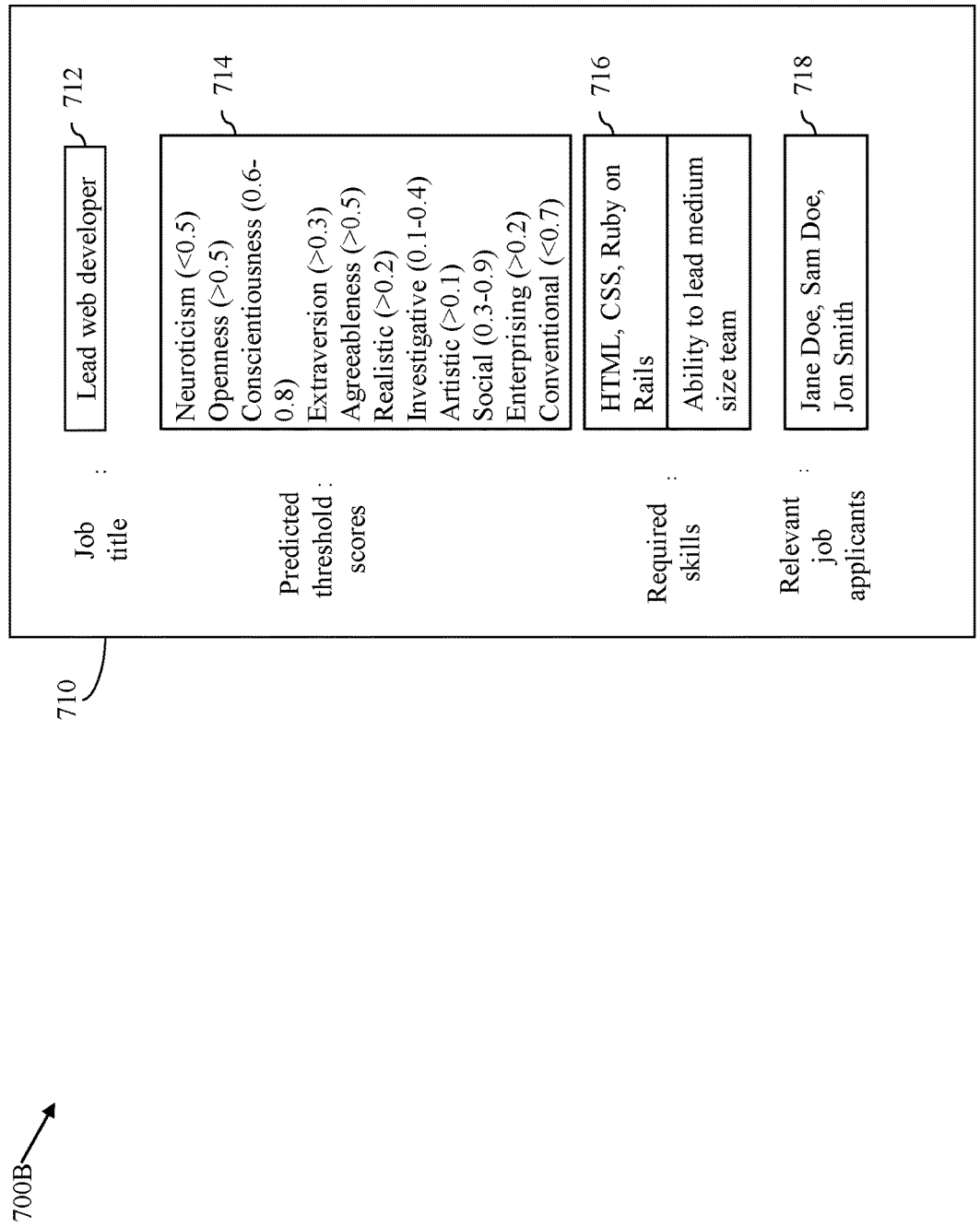

FIG. 7B is a block diagram 700B that illustrates a UI screen 710 rendered on the first user device by the application server 106 for presenting the predicted threshold scores and relevant skills, in accordance with an exemplary embodiment of the disclosure. The UI screen 710 may include a first field 712, where the first job title (i.e., 'lead web developer') is displayed. The UI screen 710 may further include a first table 714 that may display the predicted threshold scores (i.e., the first set of threshold scores). For example, the predicted threshold scores for neuroticism, openness, conscientiousness, extraversion, agreeableness, realistic, investigative, artistic, social, enterprising, and conventional are ('<0.5', '>0.5', '0.6-0.8', '>0.3', '>0.5', '>0.2', '0.1-0.4', '>0.1', '0.3-0.9', '>0.2', '<0.2'), respectively.

The UI screen 702 may further include a second table 716 that may display the relevant skills (for example, proficiency in 'HTML', 'CSS', and 'Ruby on Rails' and 'ability to lead medium size teams') for the first job position. The UI screen 702 may further include a third table 718 that may display names (here, Jane Doe, Sam Doe, Jon Smith) of relevant job applicants for the first job positions. The UI screen 702 may further include a feedback button (not shown). The first user may select the feedback button for providing a feedback score for indicating an accuracy of the predicted threshold scores and relevant skills.

Figure 8A:
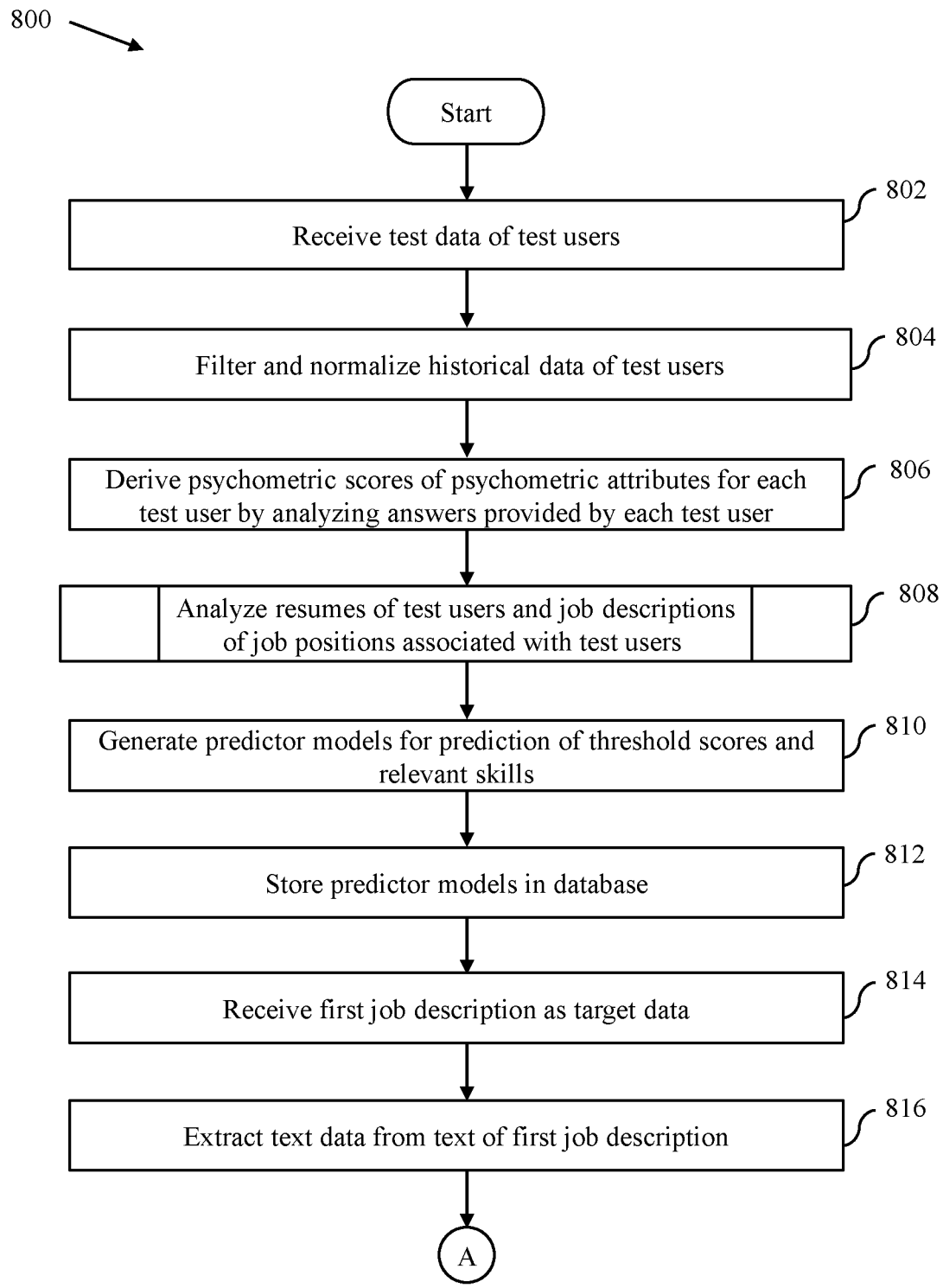
FIGS. 8A-8C, collectively represent a flow chart that illustrates a method for predicting psychometric attributes and relevant skills for the first job position, in accordance with an exemplary embodiment of the disclosure.
Figure 8B:
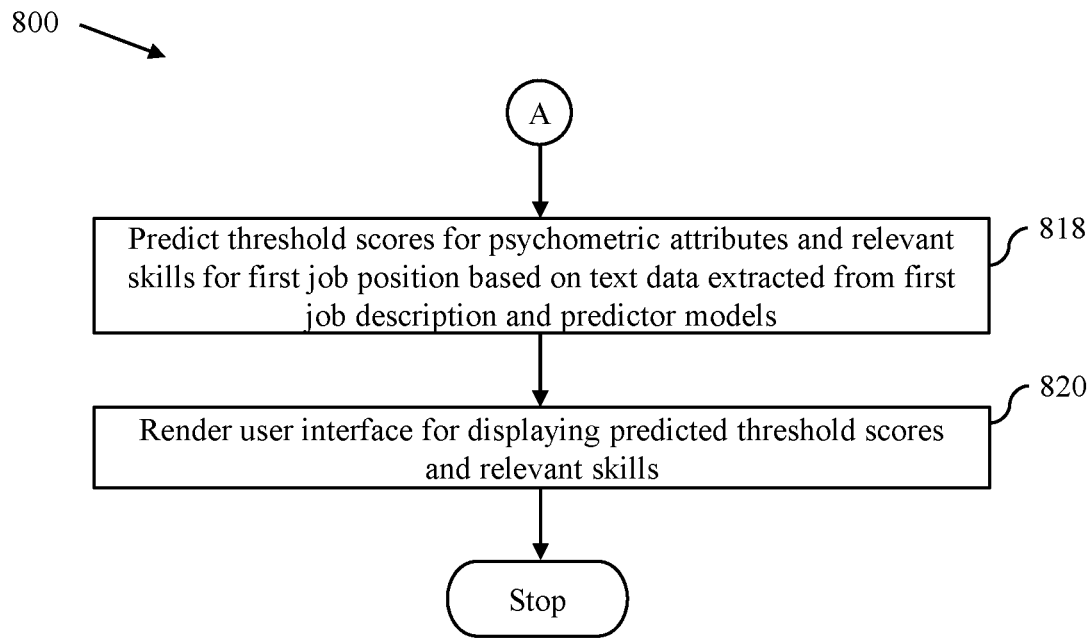
Figure 8C:
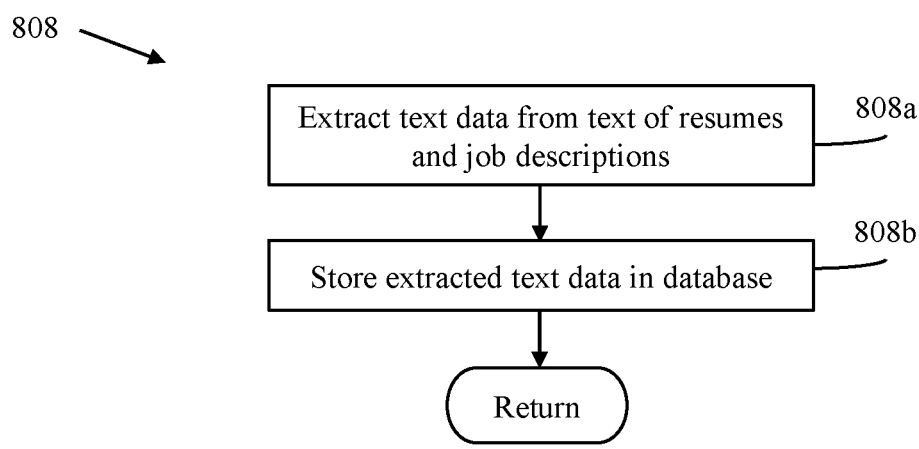

FIGS. 8A-8C, collectively represent a flow chart 800 that illustrates a method for predicting the psychometric attributes 520 and relevant skills for the first job position, in accordance with an exemplary embodiment of the disclosure. With reference to FIGS. 8A and 8B, at 802, the test data 502 of the test users 102 is received. The application server 106 may receive the test data 502, which includes the resumes 504, the job descriptions 506, the historical data 508, and the answers 510. At 804, the historical data 508 may be filtered and normalized (as described in FIG. 5). At 806, the answers 510 provided by the test users 102 are analyzed for deriving the psychometric scores of the test users 102 for the psychometric attributes 520. At 808, the resumes 504 and the job descriptions 506 are analyzed. The resumes 504 and the job descriptions 506 are analyzed by the application server 106 for extracting the first and second text data (as described in FIG. 5).

Referring now to FIG. 8C, at 808a, text data (i.e., the first and second text data) is extracted from the text of the resumes 504 and the job descriptions 506 (as shown in FIG. 5). At 808b, the extracted text data is stored in the database server 108 (as shown in FIG. 5) and 810 is performed. Referring back to FIGS. 8A and 8B, at 810, the predictor models 524 for prediction of threshold scores and relevant skills are generated (as described in FIG. 5). The predictor models 524 may be generated by the application server 106 by using the machine learning algorithms. At 812, the predictor models 524 are stored in the database server 108. At 814, the target data 602 (i.e., the first job description 302) is received. The target data 602 may be provided to the application server 106 by the first user or received by the application server 106 from an online job portal or an online database. At 816, text data (i.e., the third text data) is extracted from the text of the first job description 302. At 818, the threshold scores (i.e., the first set of threshold scores) for the psychometric attributes 520 and the relevant skills for the first job position are predicted based on the text data (i.e., the third text data) extracted from the text of the first job description 302 and the predictor models 524 (as shown in FIG. 6). At 820, the UI screen 710 is rendered on the first user device by the application server 106, displaying the predicted threshold scores (i.e., the first set of threshold scores) and the relevant skills (as shown in FIG. 7B).

Figure 9:
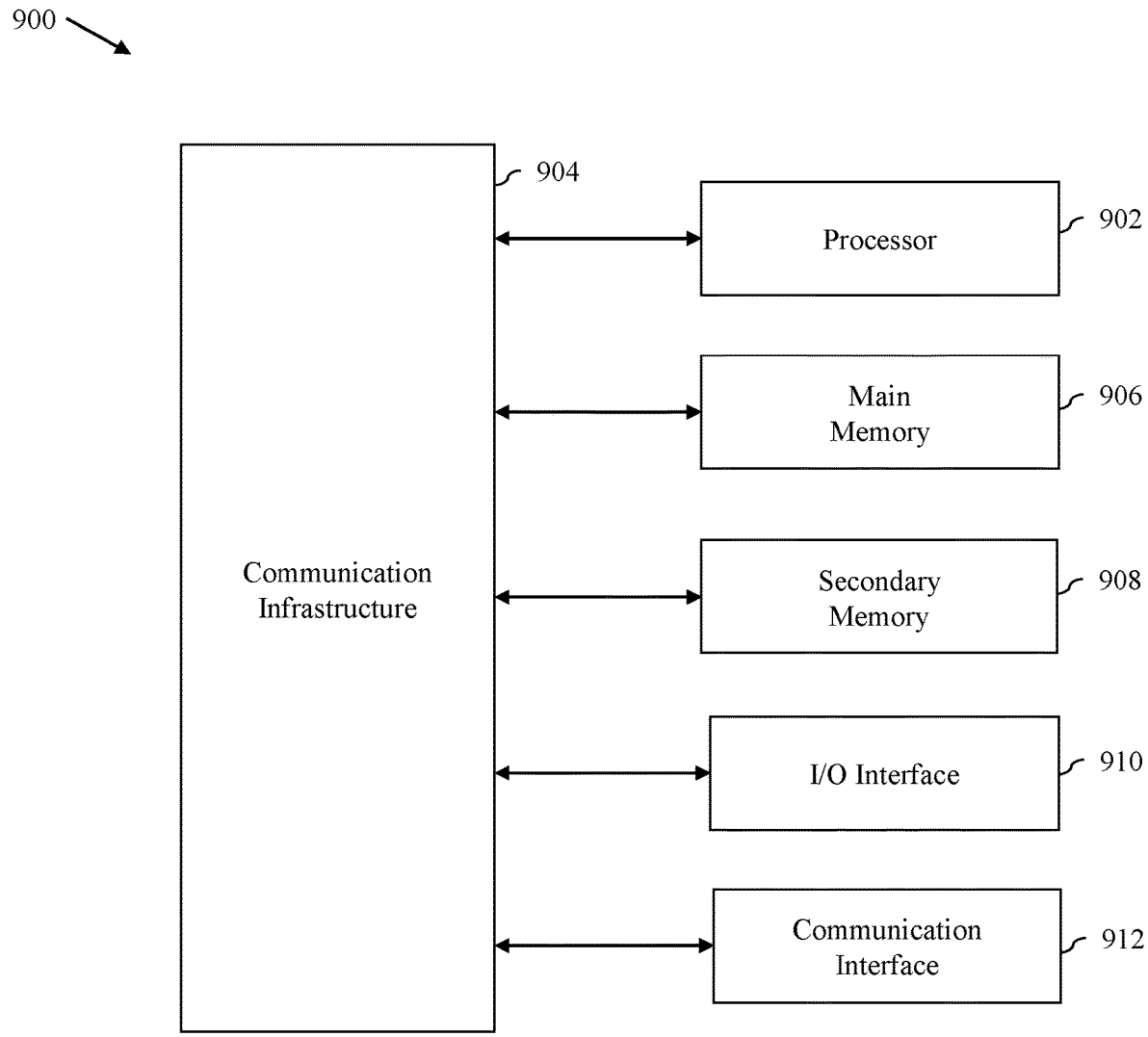
FIG. 9 is a block diagram that illustrates system architecture of a computer system, in accordance with an exemplary embodiment of the disclosure.

FIG. 9 is a block diagram that illustrates system architecture of a computer system 900, in accordance with an exemplary embodiment of the disclosure. An embodiment of disclosure, or portions thereof, may be implemented as computer readable code on the computer system 900. In one example, the test-user devices 104, the application server 106, and the database server 108 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIGS. 8A-8C.

The computer system 900 may include a processor 902 that may be a special-purpose or a general-purpose processing device. The processor 902 may be a single processor, multiple processors, or combinations thereof. The processor 902 may have one or more processor cores. In one example, the processor 902 is an octa-core processor. Further, the processor 902 may be connected to a communication infrastructure 904, such as a bus, message queue, multi-core message-passing scheme, and the like. The computer system 900 may further include a main memory 906 and a secondary memory 908. Examples of the main memory 906 may include RAM, ROM, and the like. The secondary memory 908 may include a hard disk drive or a removable storage drive, such as a floppy disk drive, a magnetic tape drive, a compact disk, an optical disk drive, a flash memory, and the like. Further, the removable storage drive may read from and/or write to a removable storage device in a manner known in the art. In one example, if the removable storage drive is a compact disk drive, the removable storage device may be a compact disk. In an embodiment, the removable storage unit may be a non-transitory computer readable recording media.

The computer system 900 may further include an input/output (I/O) interface 910 and a communication interface 912. The I/O interface 910 may include various input and output devices that are configured to communicate with the processor 902. Examples of the input devices may include a keyboard, a mouse, a joystick, a touchscreen, a microphone, and the like. Examples of the output devices may include a display screen, a speaker, headphones, and the like. The communication interface 912 may be configured to allow data to be transferred between the computer system 900 and various devices that are communicatively coupled to the computer system 900. Examples of the communication interface 912 may include a modem, a network interface, i.e., an Ethernet card, a communication port, and the like. Data transferred via the communication interface 912 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 900. Examples of the communication channel may include, but are not limited to, cable, fiber optics, a phone line, a cellular phone link, a radio frequency link, and the like. The main memory 906 and the secondary memory 908 may refer to non-transitory computer readable mediums that may provide data that enables the computer system 900 to implement the method illustrated in FIGS. 8A-8C. In embodiments where the main memory 906 and/or the secondary memory 908 comprise non-transitory computer readable medium, the non-transitory computer readable medium may have stored thereon, computer executable code, which when executed by the processor 902 in the computer system 900, cause the processor 902 and computer system 900 to execute the operations disclosed herein, for example, the operation described with respect to FIGS. 1 through 8.

Various embodiments of the disclosure may be found in a disclosed apparatus for predicting the psychometric attributes 520 relevant for the first job position. In an embodiment, the application server 106 receives the answers 510 provided by the test users 102 and the job descriptions 506 of the job positions associated with the test users 102. Each test user 102 is associated with at least one job position indicated by the job descriptions 506. For each test user 102, a set of psychometric scores corresponding to the set of psychometric attributes 520 is derived by the application server 106. The set of psychometric scores for each test user 102 may be derived based on the corresponding answers 510. The predictor models 524 may be generated by the application server 106 based on the job descriptions 506 and the set of psychometric scores of each test user 102. For the first job position, the first set of threshold scores corresponding to the set of psychometric attributes 520 is predicted by the application server 106. The first set of threshold scores is determined based on the predictor models 524 and the first job description 302 of the first job position.

Another embodiment provides a computer program product comprising a non-transitory computer readable medium that stores computer program code for predicting the psychometric attributes 520 relevant for the first job position. The computer program code is executable by one or more processors in a computing device to receive the answers 510 provided by the test users 102 and the job descriptions 506 of the job positions associated with the test users 102. Each test user 102 is associated with at least one job position indicated by the job descriptions 506. The one or more processors may be configured to derive, for each test user 102, the set of psychometric scores corresponding to the psychometric attributes 520. The set of psychometric scores for each test user 102 is derived based on the answers 510. The one or more processors may be configured to generate the predictor models 524 based on the job descriptions 506 and the set of psychometric scores of each test user 102. The one or more processors may be configured to predict, for the first job position, the first set of threshold scores corresponding to the psychometric attributes 520. The first set of threshold scores is determined based on the predictor models 524 and the first job description 302 of the first job position.

The disclosure involves the prediction of psychometric attributes relevant for the first job position by analyzing the job descriptions 506 of the job positions associated with the test users 102 and the answers 510 provided by the test users 102 to the psychometric questions. The answers 510 provided by the test users 102 to the psychometric questions allow recruiters to gain insights into the subconscious minds of the test users 102. As the subconscious mind is responsible for the majority of decision-making tasks and is directly related to an individual's psychometric orientation, the prediction accuracy of the predictor models 524 is very high. Thus, the predictor models 524 yield more accurate results in comparison to the related techniques and enable recruiters to recruit the most suitable job applicants to job positions. In one exemplary scenario, various organizations or recruitment agencies may utilize technological improvements of the predictor models 524 for identifying the most suitable job applicants for the job positions at the organizations. In another exemplary scenario, an organization may utilize the technological improvements of the predictor models 524 for judging job-affinities of employees to job positions of the employees. The technological improvements of the predictor models 524 may be used to build an employment database that indicates skills and psychometric attributes required for various job positions. The employment database may also be used to supplement an existing employment database (such as O*NET). As the test users 102 are not restricted to any specific geographical area (such as a city, state, country, or the like), the predictor models 524 are capable of predicting psychometric attributes and skills relevant for any job position, irrespective of geography.

A person of ordinary skill in the art will appreciate that embodiments of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the disclosure provide, among other features, systems and methods for predicting business outcomes. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method comprising:
   receiving, by a server, a plurality of answers provided by each test user of a plurality of test users and a plurality of job descriptions of a plurality of job positions, wherein each test user is associated with one or more job positions of the plurality of job positions, and wherein each job description of the plurality of job descriptions includes a job title of a corresponding job position of the plurality of job positions and a set of skills required for the corresponding job position;
   extracting, by the server, first text data from each job description of the plurality of job descriptions by parsing one or more first keywords in each job description of the plurality of job descriptions, wherein the first text data extracted from each job description is indicative of a corresponding job title and a corresponding set of skills;
   deriving, by the server, for each test user, a set of psychometric scores corresponding to a set of psychometric attributes, wherein the set of psychometric scores for each test user is derived based on the corresponding plurality of answers;

executing, by the server, a machine learning algorithm based on the first text data extracted from each of the plurality of job descriptions and the set of psychometric scores of each test user to generate a first neural network model and a second neural network model;

extracting, by the server, second text data from a first job description of a first job position by parsing one or more second keywords in the first job description, wherein the second text data extracted from the first job description is indicative of a job title associated with the first job position;

providing, by the server, the second text data extracted from the first job description as input to the first neural network model and the second neural network model;

predicting, by the server, for the first job position, a set of threshold score ranges corresponding to the set of psychometric attributes based on an output of the first neural network model for the inputted second text data, wherein each threshold score range of the set of threshold score ranges includes a minimum score and a maximum score for a corresponding psychometric attribute of the set of psychometric attributes;

predicting, by the server, a set of relevant skills for the first job position based on an output of the second neural network model for the inputted second text data;

rendering, by the server, on a user device of a first user, a user interface to present the set of threshold score ranges and the set of relevant skills predicted for the first job position;

receiving, by the server, a feedback, provided by way of the user interface, on accuracy of the predicted set of threshold score ranges and the predicted set of relevant skills;

updating, by the server, the first neural network model and the second neural network model based on the received feedback to improve a prediction accuracy of the first neural network model and the second neural network model;

predicting, by the server, one or more business outcomes for a target user based on the first neural network model and the second neural network model wherein the one or more business outcomes include at least an employment affinity of the target user;

receiving, by the server, historical data of each test user of the plurality of test users from a plurality of data sources having different data formats, the historical data including first historical data of a first test user of the plurality of test users in a first data format and second historical data of the first test user in a second data format different from the first data format, and converting, by the server, each of the historical data into a third data format, wherein the first data format is a comma-separated values format, a tab-separated values format, or an extensible markup language format, wherein the second data format is the comma-separated values format, the tab-separated values format, or the extensible markup language format, and wherein the third data format is a textual format including a plurality of controllable fields.

2. The method of claim 1, further comprising:

generating, by the server, a link between the first text data extracted from each job description and each psychometric attribute of the set of psychometric attributes; and assigning, by the server, a weight to the link between the first text data extracted from each job description and each psychometric attribute of the set of psychometric attributes, wherein the weight is assigned based on the set of psychometric scores of each test user.

3. The method of claim 1, wherein the execution of the machine learning algorithm to generate the first neural network model and the second neural network model is further based on the converted historical data of each test user.

4. The method of claim 3, further comprising:

filtering, by the server, the converted historical data of each test user, wherein the generation of the first neural network model and the second neural network model is further based on the filtered historical data of each test user.

5. The method of claim 1, further comprising receiving, by the server, a plurality of resumes of the plurality of test users, wherein the execution of the machine learning algorithm to generate the first neural network model and the second neural network model is further based on the plurality of resumes.

6. The method of claim 5, further comprising: extracting, by the server, third text data by parsing one or more third keywords from each of the plurality of resumes, wherein the third text data extracted from each resume of the plurality of resumes is indicative of a work experience, an educational qualification, a professional qualification, and one or more hobbies of a corresponding test user of the plurality of test users; and identifying, by the server, based on the extracted third text data, an association between each test user and the plurality of job positions.

7. The method of claim 1, further comprising identifying, by the server, for the first job position, or more relevant job applicants based on the predicted set of threshold score ranges.

8. The method of claim 7, wherein the one or more relevant job applicants are further identified based on the predicted set of relevant skills.

9. The method of claim 1, wherein the second text data extracted from the first job description is further indicating of one or more responsibilities associated with the first job position, one or more educational qualifications relevant for the first job position, and a work experience is required for the first job position.

10. The method of claim 1, further comprising:

providing, by the server, a first plurality of resumes as input to one of the first neural network model or the second neural network model; and shortlisting, by the server, for the first job position, based on the first neural network model or the second neural network model, from the inputted first plurality of resumes, one or more resumes that exhibit the predicted set of threshold score ranges and the predicted set of relevant skills.

11. The method of claim 1, further comprising building, by the server, based on the output of the first neural network model and the output of the second neural network model for the inputted second text data, an employment database that indicates (i) the predicted set of threshold score ranges corresponding to the set of psychometric attributes and (ii) the set of relevant skills, 6 required for the first job position.

12. A system comprising:

a server configured to:

receive a plurality of answers provided by each test user of a plurality of test users and a plurality of job descriptions of a plurality of job positions, wherein each test user is associated with one or more job positions of the plurality of job positions, and wherein each job description of the plurality of job descriptions includes a job title of a corresponding job position of the plurality of job positions and a set of skills required for the corresponding job position;

extract first text data from each job description of the plurality of job descriptions by parsing one or more first keywords in each job description of the plurality of job descriptions, wherein the first text data extracted from each job description is indicative of a corresponding job title and a corresponding set of skills;

derive, for each test user, a set of psychometric scores corresponding to a set of psychometric attributes, wherein the set of psychometric scores for each test user is derived based on the corresponding plurality of answers;

execute a machine learning algorithm based on the first text data extracted from each of the plurality of job descriptions and the set of psychometric scores of each test user to generate a first neural network model and a second neural network model;

extract second text data from a first job description of a first job position by parsing one or more second keywords in the first job description, wherein the second text data extracted from the first job description is indicative of a job title associated with the first job position;

provide the second text data extracted from the first job description as input to the first neural network model and the second neural network model;

predict, for the first job position, a set of threshold score ranges corresponding to the set of psychometric attributes based on an output of the first neural network model for the inputted second text data, wherein each threshold score range of the set of threshold score ranges includes a minimum score and a maximum score for a corresponding psychometric attribute of the set of psychometric attributes;

predict a set of relevant skills for the first job position based on an output of the second neural network model for the inputted second text data;

render, on a user device of a first user, a user interface to present the set of threshold score ranges and the set of relevant skills predicted for the first job position;

receive a feedback, provided by way of the user interface, on accuracy of the predicted set of threshold score ranges and the predicted set of relevant skills;

update the first neural network model and the second neural network model based on the received feedback to improve a prediction accuracy of the first neural network model and the second neural network model;

predict one or more business outcomes for a target user based on the first neural network model and the second neural network model wherein the one or more business outcomes include at least an employment affinity of the target user;

receive historical data of each test user of the plurality of test users from a plurality of data sources having different data formats, the historical data including first historical data of a first test user of the plurality of test users in a first data format and second historical data of the first test user in a second data format different from the first data format; and convert each of the historical data into a third data format, wherein the first data format is a comma-separated values format, a tab-separated values format, or an extensible markup language format, wherein the second data format is the comma-separated values format, the tab-separated values format, or the extensible markup language format, and wherein the third data format is a textual format including a plurality of controllable fields.

13. The system of claim 12, wherein the server is further configured to:
generate a link between the first text data extracted from each job description and each psychometric attribute of the set of psychometric attributes; and
assign a weight to the link between the first text data extracted from each job description and each psychometric attribute of the set of psychometric attributes, wherein the weight is assigned based on the set of psychometric scores of each test user.

14. The system of claim 12, wherein the server executes the machine learning algorithm to generate the first neural network model and the second neural network model further based on the converted historical data of each test user, and wherein the historical data of each test user includes social media data, purchase data, travel history data, educational qualifications data, one or more likes, or one or more dislikes of a corresponding test user of the plurality of test users.

15. The system of claim 12, wherein the server is further configured to receive a plurality of resumes of the plurality of test users, and wherein the server executes the machine learning algorithm to generate the first neural network model and the second neural network model further based on the plurality of resumes.

16. The system of claim 15, wherein the server is configured to:
extract third text data by parsing one or more third keywords from each of the plurality of resumes, and wherein the third text data extracted from each resume of the plurality of resumes is indicative of a work experience, an educational qualification, a professional qualification, and one or more hobbies of a corresponding test user of the plurality of test users; and
identify, based on the extracted third text data, an association between each test user and the plurality of job positions.

17. The system of claim 12, wherein the server is further configured to identify, for the first job position, one or more relevant job applicants based on the predicted set of threshold score ranges.

18. The system of claim 17, wherein the server identifies the one or more relevant job applicants further based on the predicted set of relevant skills.

19. A non-transitory computer readable medium having stored thereon, computer executable instruction, which when executed by a computer, cause the computer to execute operations, the operations comprising:
receiving a plurality of answers provided by each test user of a plurality of test users and a plurality of job descriptions of a plurality of job positions, wherein each test user is associated with one or more job positions of the plurality of job positions, and wherein each job description of the plurality of job descriptions includes a job title of a corresponding job position of the plurality of job positions and a set of skills required for the corresponding job position;
extracting first text data from each job description of the plurality of job descriptions by parsing one or more first keywords in each job description of the plurality of job descriptions, wherein the first text data extracted from each job description is indicative of a corresponding job title and a corresponding set of skills;

deriving, for each test user, a set of psychometric scores corresponding to a set of psychometric attributes, wherein the set of psychometric scores for each test user is derived based on the corresponding plurality of answers;

executing a machine learning algorithm based on the first text data extracted from each of the plurality of job descriptions and the set of psychometric scores of each test user to generate a first neural network model and a second neural network model;

extracting second text data from a first job description of a first job position by parsing one or more second keywords in the first job description, wherein the second text data extracted from the first job description is indicative of a job title associated with the first job position;

providing the second text data extracted from the first job description as input to the first neural network model and the second neural network model;

predicting, for the first job position, a set of threshold score ranges corresponding to the set of psychometric attributes based on an output of the first neural network model for the inputted second text data, wherein each threshold score range of the set of threshold score ranges includes a minimum score and a maximum score for a corresponding psychometric attribute of the set of psychometric attributes;

predicting a set of relevant skills for the first job position based on an output of the second neural network model for the inputted second text data;

rendering, on a user device of a first user, a user interface to present the set of threshold score ranges and the set of relevant skills predicted for the first job position;

receiving a feedback, provided by way of the user interface, on accuracy of the predicted set of threshold score ranges and the predicted set of relevant skills;

updating the first neural network model and the second neural network model based on the received feedback to improve a prediction accuracy of the first neural network model and the second neural network model;

predicting one or more business outcomes for a target user based on the first neural network model and the second neural network model wherein the one or more business outcomes include at least an employment affinity of the target users;

receiving historical data of each test user of the plurality of test users from a plurality of data sources having different data formats, the historical data including first historical data of a first test user of the plurality of test users in a first data format and second historical data of the first test user in a second data format different from the first data format, and converting each of the historical data into a third data format, wherein the first data format is a comma-separated values format, a tab-separated values format, or an extensible markup language format, wherein the second data format is the comma-separated values format, the tab-separated values format, or the extensible markup language format, and wherein the third data format is a textual format including a plurality of controllable fields.

* * * * *